(12) United States Patent
Wang et al.

(10) Patent No.: US 11,917,544 B2
(45) Date of Patent: Feb. 27, 2024

(54) ENERGY-SAVING SIGNAL TRANSMISSION METHOD AND DETECTION METHOD, AND DEVICE

(71) Applicant: DATANG MOBILE COMMUNICATIONS EQUIPMENT CO., LTD., Beijing (CN)

(72) Inventors: Jiaqing Wang, Beijing (CN); Fangchen Cheng, Beijing (CN); Meiying Yang, Beijing (CN); Chen Luo, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 281 days.

(21) Appl. No.: 17/421,322

(22) PCT Filed: Jan. 3, 2020

(86) PCT No.: PCT/CN2020/070236
§ 371 (c)(1),
(2) Date: Jul. 7, 2021

(87) PCT Pub. No.: WO2020/143543
PCT Pub. Date: Jul. 16, 2020

(65) Prior Publication Data
US 2022/0070784 A1  Mar. 3, 2022

(30) Foreign Application Priority Data

Jan. 7, 2019 (CN) .......................... 201910011983.1

(51) Int. Cl.
*H04L 27/02* (2006.01)
*H04W 52/02* (2009.01)

(52) U.S. Cl.
CPC ......... *H04W 52/0235* (2013.01); *H04L 27/02* (2013.01); *H04W 52/0232* (2013.01)

(58) Field of Classification Search
CPC .... H04W 27/02; H04W 52/0232; H04L 12/28
(Continued)

(56) References Cited

U.S. PATENT DOCUMENTS 11,418,283 B2 * 8/2022 Jiang .................. H04W 72/23
2014/0018085 A1 1/2014 Young et al.
(Continued)

FOREIGN PATENT DOCUMENTS

CN 104737597 A 6/2015
CN 105337744 A 2/2016
(Continued)

OTHER PUBLICATIONS

CN107360619 ( Translation) 10 pages, Nov. 17, 2017).*
(Continued)

*Primary Examiner* — Dang T Ton
(74) *Attorney, Agent, or Firm* — Ladas & Parry, LLP

(57) ABSTRACT

A method and a device of transmitting a power saving signal, a method and a device of detecting a power saving signal are provided. A method applied to a base station includes receiving power-saving-signal indication information reported by a first terminal, the power-saving-signal indication information being at least used to indicate that the first terminal supports or does not support reception of the power saving signal; sending the power saving signal to the first terminal when the power-saving-signal indication information indicates that the first terminal supports reception of the power saving signal.

18 Claims, 5 Drawing Sheets

When a first terminal needs to be woken up, determining a first binary sequence corresponding to the first terminal — 60

Sending a power saving signal to the first terminal, the power saving signal including a OOK signal of the first binary sequence — 61

(58) Field of Classification Search
USPC .................... 370/329, 400, 401, 405, 468
See application file for complete search history.

(56) References Cited

U.S. PATENT DOCUMENTS

| | | |
|---|---|---|
| 2014/0112229 A1 | 4/2014 | Merlin et al. |
| 2016/0374019 A1 | 12/2016 | Park et al. |
| 2017/0332327 A1 | 11/2017 | Fang et al. |
| 2018/0063788 A1 | 3/2018 | Yang et al. |
| 2018/0124704 A1 | 5/2018 | Jung et al. |

FOREIGN PATENT DOCUMENTS

| | | |
|---|---|---|
| CN | 107360619 A | 11/2017 |
| CN | 108024321 A | 5/2018 |
| WO | 2014073799 A1 | 5/2014 |
| WO | 2018016757 A1 | 1/2018 |
| WO | 2018108264 A1 | 6/2018 |
| WO | 2018143971 A1 | 8/2018 |
| WO | 2018151432 A1 | 8/2018 |
| WO | 2018204799 A1 | 11/2018 |

OTHER PUBLICATIONS

First Office Action for Chinese Patent Application 202110917231.9 issued by the Chinese Patent Office dated Aug. 2, 2022, and Its English Translation provided by Global Dossier.

First Office Action for Korean Patent Application 10-2021-7024444 issued by the Korean Patent Office dated May 30, 2022, and Its English Translation provided by Global Dossier.

Extended European Search Report for European Patent Application 20738150.0 issued by the European Patent Office dated Jun. 1, 2022.

"UE Power saving schemes with power saving signal/channel/procedures", 3GPP TSG RAN WG1 Meeting #94bis, R1-1810563, Chengdu, China, Oct. 8-12, 2018, Source: CATT, all pages.

"Triggering adaptation for UE power saving," 3GPP TSG RAN WG1 Meeting #95, R1-1812362, Spokane, USA, Nov. 12-16, 2018, Source: MediaTek Inc., Agenda Item: 7.2.9.2.2, all pages.

International Search Report from PCT/CN2020/070236, dated Mar. 17, 2020, with English translation from WIPO, all pages.

Written Opinion of the International Seraching Authority from PCT/CN2020/070236, dated Mar. 17, 2020, with English translation from WIPO, all pages.

International Preliminary Report on Patentability from PCT/CN2020/070236, dated Jun. 16, 2021 with English translation from WIPO, all pages.

First Office Action and Search Report from TW app. No. 109100288, dated Jun. 24, 2021, with machine English translation, all pages.

* cited by examiner

ENERGY-SAVING SIGNAL TRANSMISSION METHOD AND DETECTION METHOD, AND DEVICE

CROSS REFERENCE TO RELATED APPLICATIONS

This application is a U.S. national phase application of a PCT Application No. PCT/CN2020/070236 filed on Jan. 3, 2020, which claims a priority to Chinese Patent Application No. 201910011983.1 filed in China on Jan. 7, 2019, the disclosures of which are incorporated in their entireties by reference herein.

TECHNICAL FIELD

The present disclosure relates to the field of communications technologies, in particular, relates to a method and a device of transmitting a power saving signal, and a method and a device of detecting a power saving signal.

BACKGROUND

In a fifth-generation New Radio Access Technology (5G NR) system, there are three operational states of a User Equipment (UE), i.e., a Radio Resource Control (RRC) idle state (RRC_IDLE), a RRC inactive state (RRC_Inactive) and a RRC connected state (RRC_Connected). In the first two states, the UE needs to monitor a paging signal. When the UE receives the paging signal, it indicates that there is data transmission at a network side, and the UE needs to enter the RRC_Connected state to receive the downlink data. While in the RRC_Connected state, the UE needs to continuously monitor a Physical Downlink Control Channel (PDCCH) to know transmission information about a Physical Downlink Shared Channel (PDSCH).

A group-based data flow is usually bursty, with data transmission for a period of time, but no data transmission for a long period of time thereafter. Continuous monitoring of the PDCCH inevitably leads to fast power consumption of the UE. Therefore, when there is no data transmission, power consumption can be reduced by stopping receiving the PDCCH (at this time, blind detection of the PDCCH will be stopped). Therefore, the 3rd Generation Partnership Project (3GPP) is designed to achieve a power saving purpose through a Discontinuous Reception (DRX) mechanism, as shown in FIG. 1. In a DRX cycle, the UE monitors the Physical Downlink Control Channel (PDCCH) only in an On Duration, but in "Opportunity for DRX (DRX opportunity)," i.e., DRX OFF (Discontinuous Reception OFF) duration, the UE does not receive the PDCCH to reduce power consumption, i.e., enters a sleep mode.

In order to quickly respond to scheduling from a base station and reduce a latency of the UE, it is difficult for the OFF cycle in DRX to be configured to as a longer time period in a mobile communication system. Thus, frequency switching of DRX on/off duration by the UE greatly reduces a power saving effect.

The power saving signal for waking up a UE in a NR scenario is still under discussion in 3GPP. A transmission scheme of the power saving signal between a terminal and a base station, a form of the power saving signal, and the like are not specified. It is necessary therefore to provide a scheme for implementing transmission of a power saving signal between a base station and a terminal.

SUMMARY

An objective of some embodiments of the present disclosure is to provide a scheme for transmitting a power saving signal between a base station and a terminal.

Some embodiments of the present disclosure provide a method of transmitting a power saving signal. The method is performed by a base station, the method includes: receiving power-saving-signal indication information reported by a first terminal, wherein the power-saving-signal indication information is at least used to indicate that the first terminal supports reception of the power saving signal or the first terminal does not support reception of the power saving signal; sending the power saving signal to the first terminal when the power-saving-signal indication information indicates that the first terminal supports reception of the power saving signal.

Some embodiments of the present disclosure provide another method of transmitting a power saving signal. The method is performed by a base station. The method includes determining a first binary sequence corresponding to a first terminal when the first terminal needs to be woken up; sending the power saving signal to the first terminal, wherein the power saving signal includes an On Off Key (OOK) signal of the first binary sequence.

Some embodiments of the present disclosure provide a method of detecting a power saving signal. The method is performed by a first terminal. The method includes: reporting power-saving-signal indication information to a base station, wherein the power-saving-signal indication information is at least used to indicate that the first terminal supports reception of the power saving signal or the first terminal does not support reception of the power saving signal; detecting the power saving signal sent by the base station when the first terminal supports the reception of the power saving signal.

Some embodiments of the present disclosure provide a base station. The base station includes a transceiver, a storage, a processor and a computer program stored on the storage and executable by the processor, wherein the transceiver is configured for: receiving power-saving-signal indication information reported by a first terminal, wherein the power-saving-signal indication information is at least used to indicate that the first terminal supports reception of the power saving signal or the first terminal does not support reception of the power saving signal; and sending the power saving signal to the first terminal when the power-saving-signal indication information indicates that the first terminal supports reception of the power saving signal.

Some embodiments of the present disclosure provide another base station. The base station includes a transceiver, a storage, a processor and a computer program stored on the storage and executable by the processor, wherein the processor is configured to read the program in the storage and execute a following process: determining a first binary sequence corresponding to a first terminal when the first terminal needs to be woken up; the transceiver is configured for sending the power saving signal to the first terminal, wherein the power saving signal includes an On Off Key (OOK) signal of the first binary sequence.

Some embodiments of the present disclosure provide a first terminal. The first terminal includes a transceiver, a storage, a processor and a computer program stored on the storage and executable by the processor, wherein, the transceiver is configured for reporting power-saving-signal indication information to a base station, wherein the power-saving-signal indication information is at least used to indicate that the first terminal supports reception of the power saving signal or the first terminal does not support reception of the power saving signal; the processor is configured to read the program in the storage and execute a following process: detecting the power saving signal sent by the base station when the first terminal supports the reception of the power saving signal.

Some embodiments of the present disclosure provide yet another base station. The base station includes: a receiving unit configured to receive power-saving-signal indication information reported by a first terminal, wherein the power-saving-signal indication information is at least used to indicate that the first terminal supports or does not support reception of the power saving signal; a sending unit configured to when the first terminal supports reception of the power saving signal, send the power saving signal to the first terminal.

Some embodiments of the present disclosure provide yet another base station. The base station includes: a determination unit configured to, when a first terminal needs to be woken up, determine a first binary sequence corresponding to the first terminal; and a transmission unit configured to send a power saving signal to the first terminal, wherein the power saving signal includes an On Off Key (OOK) signal of the first binary sequence.

Some embodiments of the present disclosure provide yet another first terminal. The first terminal includes: a transmitting unit configured to report power-saving-signal indication information to a base station, wherein the power-saving-signal indication information is at least used to indicate that the first terminal supports or does not support reception of the power saving signal; a detecting unit configured to, when the first terminal supports reception of the power saving signal, detect the power saving signal sent by the base station.

Some embodiments of the present disclosure provide a computer-readable storage medium including instructions. When the instructions are executed by a computer, the computer performs the method as described above.

According to the method and the device of transmitting a power saving signal, the method and the device of detecting a power saving signal, the base station of some embodiments of the present disclosure may transmit the power saving signal to the terminal according to the power-saving-signal indication information sent by the terminal, thereby realizing indication and transmission of the power saving signal. In addition, some embodiments of the present disclosure may also transmit an OOK signal of a binary sequence as the power saving signal, which may greatly reduce the power consumption required for the terminal to detect the power saving signal.

BRIEF DESCRIPTION OF THE DRAWINGS

In order to more clearly explain technical solutions of some embodiments of the present disclosure, the following provides brief description of drawings that are used in description of the some embodiments of the present disclosure. It will be apparent that, the drawings in the following description are only a few embodiments of the present disclosure, and for those of ordinary skill in the art, other drawings may be obtained from the drawings without paying creative labor.

DETAILED DESCRIPTION

Figure 1:
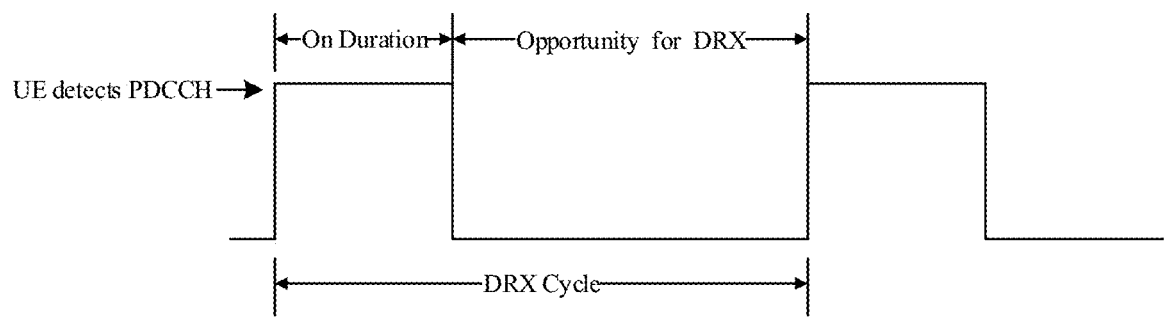
FIG. 1 shows a schematic diagram of a DRX application in related art.

Exemplary embodiments of the present disclosure will be described in more detail below with reference to accompanying drawings. Although exemplary embodiments of the present disclosure are shown in the drawings, it should be understood that the present disclosure may be implemented in various forms and should not be limited by the embodiments set forth herein. Rather, these embodiments are provided to enable more thorough understanding of the present disclosure and to convey the full scope of the present disclosure to those skilled in the art.

Such terms as "first", "second", etc. in the specification and claims of the present application are used to distinguish similar objects and are not necessarily used to describe a particular order or a precedence order. It should be understood that terms used in this way may be interchanged where appropriate, so that the embodiments of the present application described herein, for example, can be implemented in an order other than those illustrated or described herein. Furthermore, such terms as "comprising", "including", "having", and any variations thereof, are intended to cover non-exclusive inclusion. For example, a process, a method, a system, a product or a device including a series of steps or units need not be limited to those steps or units that are clearly listed, but may include other steps or elements that are not explicitly listed or inherent to these processes, methods, products or devices. In the specification and the claims, "and/or" means at least one of objects being connected by this expression.

The techniques described herein are not limited to Long Time Evolution (LTE), LTE-Advanced (LTE-A) and NR systems, and may also be used in various radio communication systems, such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA) and other systems. The terms "system" and "network" are often used interchangeably. The CDMA system may implement radio technologies such as CDMA2000, Universal Terrestrial Radio Access (UTRA), and the like. UTRA includes Wideband Code Division Multiple Access (WCDMA) and other CDMA variants. The TDMA system may implement a radio technology such as Global System for Mobile Communication (GSM). The OFDMA system may implement radio technologies such as Ultra Mobile Broadband (UMB), Evolution-UTRA (E-UTRA), IEEE 802.11 (Wi-Fi), IEEE 802.16 (WiMAX), IEEE 802.20, and Flash-OFDM. UTRA and E-UTRA are part of Universal Mobile Telecommunications System (UMTS). LTE and more advanced LTE, such as LTE-A, are new UMTS versions that use E-UTRA. UTRA, E-UTRA, UMTS, LTE, LTE-A and GSM are described in literature from an organization named 3rd Generation Partnership Project (3GPP). CDMA2000 and UMB are described in literature from an organization named 3rd Generation Partnership Project 2 (3GPP2). The techniques described herein may be used both for the systems and radio technologies mentioned above and for other systems and radio technologies. However, following description describes the NR system for example purposes, and NR terminology is used in most of the following description, although these techniques are also applicable to applications other than NR system applications.

The following description provides examples and does not limit the scope, applicability or configuration set forth in the claims. Changes may be made to functions and arrangement of elements discussed without departing from the spirit and the scope of the present disclosure. Various examples may suitably omit, replace, or add various procedures or components. For example, the described methods may be performed in an order other than that described, and various steps may be added, omitted, or combined. In addition, features described with reference to certain examples may be combined in other examples.

Figure 2:
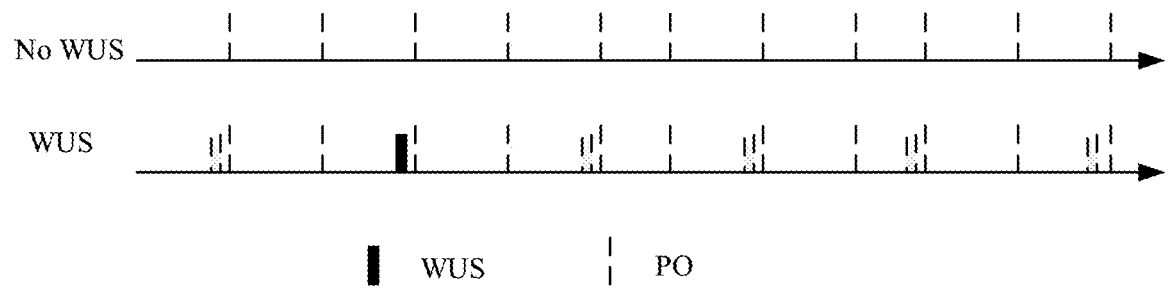
FIG. 2 is an example of a WUS application in related art.

In study to power consumption of narrow band IoT (NB-IoT), it is considered to add a Wake Up signal (WUS) to trigger detection of a paging signal, as shown in the figure. Dashed vertical lines in FIG. 2 indicate a Paging Opportunity (PO) of a paging opportunity. In the absence of the Wake Up signal (WUS), a UE in the RRC_IDLE state or the RRC_Inactive state needs to periodically wake up to receive a possible paging signal in each PO position. The UE needs to blind-detect a PDCCH of a possible paging signal before each detection of the possible paging signal, and if the PDCCH of the paging signal is detected, then the UE continues to decode the paging signal, otherwise no decoding is performed. Another method is to send a Wake Up signal (WUS) before the paging signal, start to blind-detect the PDCCH of the paging signal if the WUS is detected, or give up detection of the paging signal in the PO if the WUS is not detected. Since WUS can be designed as one sequence, its detection complexity is much lower than that of blind detection of PDCCH, so receiving power consumption can be greatly reduced by using the WUS.

For the NR system, the Wake Up signal for the RRC_IDLE state may refer to the idea of a NB-IoT, but the NR system and the NB-IoT system have a big difference in that the power consumption in the NR system is mainly in the RRC_Connected mode. Application scenarios are also very different, NR focuses on transmissions of a large bandwidth, a high throughput, supporting high-speed mobility and large connection, and processing complexity of a chip in a terminal is much higher than that in NB-IoT, so it is necessary to optimize a design of Wake Up signal according to the characteristics of the NR.

For the LTE, the NR or a subsequent evolved communication system, the UE in the RRC connected state or in the idle state needs to frequently perform a warm up operation and detect a power saving signal, thus, high efficiency and power saving cannot be achieved. For example, if the user has no paging or scheduling information message for a long time, then it is not necessary to frequently detect the power saving signal. For a DRX cycle configured periodically, if data arrives at the end of the DRX on duration, the UE cannot sleep in the remaining DRX on durations, which will cause power consumption waste. On the other hand, for a user in DRX on duration, if arrival of data for the user is intermittent, it will cause the PDCCH detection to be always performed even if there is no data in the DRX on duration, this requires a smaller time period for detection of a power saving signal. Therefore, although frequent detection of a power saving signal is beneficial to power saving, but frequent reception of power saving signals will result in increased power consumption. Therefore, one possible efficient power saving scheme is that reception of a power saving signal has an extremely low power consumption, so that the UE can always listen to a frequency band dedicated for transmitting the power saving signal, a RF circuit for data reception is not activated until the power saving signal is received. In this way, the UE can detect the power saving signal or continuously monitor the power saving signal at a small cycle without causing a significant increase in power consumption.

Figure 3:
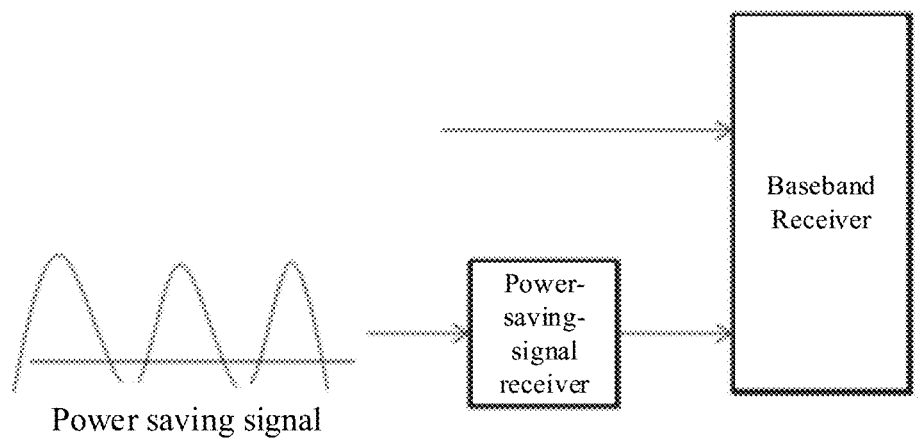
FIG. 3 is an example of a low-power-consumption power-saving-signal receiver that may be used by some embodiments of the present disclosure.

There may be two kinds of power-saving-signal receivers, one of which is a digital baseband receiver which may be combined with a baseband receiver of an existing terminal, and the other of which is a radio frequency analog receiver (a power-saving-signal receiver) for receiving the power saving signal, the radio frequency analog receiver can be independent from the baseband receiver of the existing terminal, and only when the Wake Up signal is detected, the terminal is triggered to wake up (the baseband receiver starts to operate), one structure of such an independent receiver is shown in FIG. 3.

In discussion of the 3GPP, there may be following solutions for the power saving signal for waking up a user in a NR scenario.

1) In the DRX off duration, one PDCCH is transmitted for the power saving signal, this solution requires a high power consumption for a baseband demodulation and decoding module, and this solution requires fine synchronization otherwise the PDCCH will not be received. Another disadvantage is that if a large number of users are woken up at the same time, a large resource overhead is required.

2) A existing signal in NR, such as a channel state information reference signal (CSI-RS) or a time reference signal (TRS), power consumption of which is lower than the power saving signal based on PDCCH, but the resource overhead is large, and similar to WUS of NB-IOT, an efficiency is low in cases where the power saving signal needs to be received frequently.

Some embodiments of the present disclosure provide a transmission method and a detection method of a power saving signal, and transmission and detection of the power saving signal can be realized based on a low power receiver. The methods and the devices of some embodiments of the present disclosure will be described in detail below.

Figure 4:
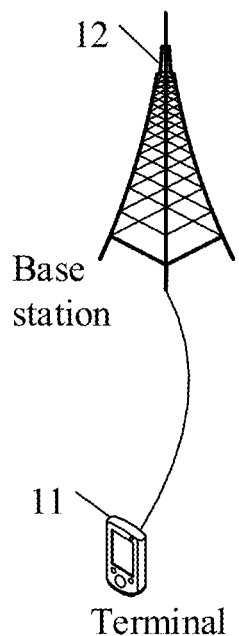
FIG. 4 is a schematic diagram of an application scenario of some embodiments of the present disclosure.

Please refer to FIG. 4, which illustrates a block diagram of a radio communication system to which some embodiments of the present disclosure may be applied. The radio communication system includes a terminal 11 and a base station 12. The terminal 11 may also be referred to as a User Equipment (UE), and the terminal 11 may be a terminal-side device such as a mobile phone, a Tablet Personal Computer, a Laptop Computer, a Personal Digital Assistant (PDA), a Mobile Internet Device (MID), a Wearable Device or a vehicle-mounted device. It should be noted that a specific type of the terminal 11 is not limited in some embodiments of the present disclosure. The base station 12 may be a base station of 5G and later versions, such as a gNB, a 5G NR NB, etc., or a base station in other communication systems, such as an eNB, a WLAN access point, or other access points, etc., wherein, the base station may be referred to as a Node B, an evolved Node B, an access point, a Base Transceiver Station (BTS), a radio base station, a radio transceiver, a Basic Service Set (BSS), an Extended Service Set (ESS), a Node B, an evolved Node B (eNB), a home Node B, a home evolved Node B, a WLAN access point, a WiFi node or some other suitable terminology in the field, as long as the same technical effect is achieved, the base station is not limited to a specific technical vocabulary, and it should be noted that in some embodiments of the present disclosure, only the base station in the NR system is taken as an example, but the specific type of the base station is not limited.

The base station 12 may communicate with the terminal 11 under the control of a base station controller, which may be part of a core network or certain base stations in various examples. Some base stations may communicate control information or user data with the core network through a backhaul. In some examples, some of these base stations may communicate with each other directly or indirectly over a backhaul link, which may be a wired or wireless communication link. A radio communication system may support operation on multiple carriers (waveform signals of different frequencies). The multi-carrier transmitter is capable of transmitting modulated signals on the multiple carriers simultaneously. For example, each communication link may be a multicarrier signal modulated according to various radio technologies. Each modulated signal may be sent on a different carrier and may carry control information (e.g., reference signals, control channels, etc.), overhead information, data, etc.

The base station 12 may communicate wirelessly with the terminal 11 via one or more access point antennas. Each base station may provide communication coverage for a respective coverage area. Coverage areas of the access points may be divided into sectors that form only a portion of the coverage area. A radio communication system may include different types of base stations (e.g., macro base stations, micro base stations, or pico base stations). The base stations may also utilize different radio technologies, such as cellular access technologies or WLAN radio access technologies. The base stations may be associated with the same or different access networks or operator deployments. Coverage areas of different base stations (including coverage areas of base stations of the same or different types, coverage areas using the same or different radio technologies, or coverage areas belonging to the same or different access networks) may overlap.

A communication link in a radio communication system may include an Uplink (UL) for carrying uplink transmissions (such as from the terminal 11 to the base station 12), or a Downlink (DL) for carrying Downlink (DL) transmissions (such as, from the base station 12 to the terminal 11). UL transmissions may also be referred to as reverse link transmissions, while DL transmissions may also be referred to as forward link transmissions. The downlink transmission may be made using a licensed frequency band, an unlicensed frequency band, or both. Similarly, uplink transmissions may be made using licensed frequency bands, unlicensed frequency bands, or both.

Figure 5:
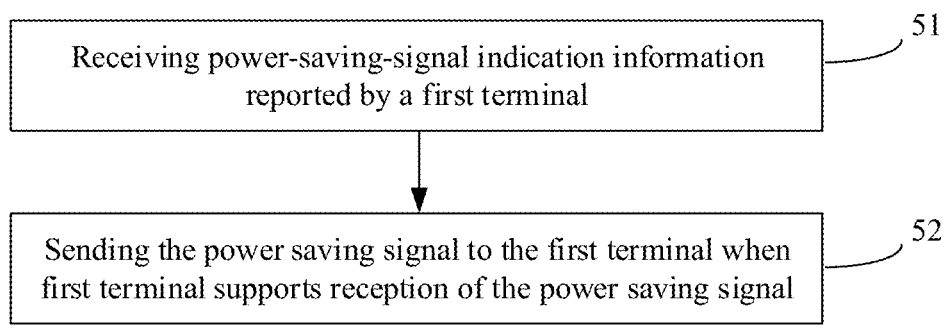
FIG. 5 is a flowchart of a method of transmitting a power saving signal according to some embodiments of the present disclosure.

Referring to FIG. 5, some embodiments of the present disclosure provide a method of transmitting a power saving signal. The method is applied to a base station. The method includes Steps 51 and 52.

Step 51: receiving power-saving-signal indication information reported by a first terminal, wherein the power-saving-signal indication information is at least used to indicate that the first terminal supports or does not support reception of the power saving signal;

Step 52: when the power-saving-signal indication information indicates that the first terminal supports reception of the power saving signal, sending the power saving signal to the first terminal.

Through the above steps, in some embodiments of the present disclosure, the terminal may send the power-saving-signal indication information to the base station, and the base station may send the power saving signal to the terminal according to the power-saving-signal indication information sent by the terminal, thereby realizing indication and transmission of the power saving signal.

In some embodiments of the present disclosure, the power saving signal is a signal for waking up the terminal. In the above step 51, the power-saving-signal indication information may also be used to indicate at least one of the following information: a type of a power saving signal supported by the first terminal, wherein types of power saving signals include a power saving signal based on a digital baseband receiver, a power saving signal based on a radio frequency analog receiver, a power saving signal based on a sequence, and a power saving signal based on a PDCCH; whether the first terminal needs to configure or support additional usage of the power saving signal, wherein the additional usage includes beam management during a DRX OFF duration.

Here, the power saving signal based on the radio frequency analog receiver may be the case shown in FIG. 3 in which a radio frequency analog receiver independent of a baseband receiver is used to receive an analog signal in a radio frequency domain, without a baseband module (such as the baseband demodulation and decoding module, an AGC module and other modules related to processing at a physical layer) of the terminal being activated, so that the power consumption required for the terminal to receive the power saving signal can be greatly reduced.

In addition, an orthogonal sequence or a pseudo-random sequence may be used for the power saving signal based on a sequence, and specifically, a binary orthogonal sequence or a pseudo-random sequence may be used.

Optionally, the base station may also transmit configuration information of the power saving signal needing to be received by the first terminal, before the step 52 of transmitting the power saving signal. The configuration information includes at least the type of the power saving signal needing to be received by the first terminal. Here, the configuration information may also configure information such as a time domain resource location of the power saving signal. Specifically, the base station may semi-statically and/or dynamically transmit the configuration information of the power saving signal needing to be received by the first terminal. For example, when configuring semi-statically, the base station may semi-statically, through a RRC signaling, transmit the configuration information of the power saving signal needing to be received by the first terminal. When configuring dynamically, the base station may dynamically, through a Medium Access Control Control Element (MAC CE) or a PDCCH, transmit the configuration information of the power saving signal to be received by the first terminal.

Optionally, the base station may determine the configuration information of the power saving signal for the first terminal according to a plurality of kinds of information before configuring information of the power saving signal needing to be received by the first terminal. For example, the base station may, when the power-saving-signal indication information indicates that the first terminal supports multiple types of power saving signals, determine the type of the power saving signal needing to be received by the first terminal, according to at least one of following pieces of state information of the first terminal: location change information of the first terminal; reception quality information of a signal of the first terminal; a movement state of the first terminal; an access frequency band of the first terminal.

Optionally, in the above method, the terminal (specifically, the first terminal as mentioned above) may report whether the terminal supports the power saving signal (also referred to as power saving signal herein) to the base station. For example, the terminal may report 1-bit power-saving-signal indication information (i.e., power-saving-signal indication information) for indicating whether the reception of the power saving signal is supported, wherein, if the terminal supports the reception of the power saving signal, the indication information is indicated by a bit value of 1, and if the reception of the power saving signal is not supported, the indication information is indicated by a bit value of 0. Optionally, the terminal not supporting the power saving signal may not report the power-saving-signal indication information, and only the terminal supporting the power saving signal may report the power-saving-signal indication information.

In addition, the terminal can also report the type of the power saving signal supported by the terminal, by using the power saving indication information. For example, a bit value of 1 may indicate a power saving signal based on the baseband receiver (or the power saving signal supports the baseband receiver), and a bit value of 0 is used to indicate a power saving signal (or a power saving signal supports a low power consumption receiver) based on a low power consumption receiver such as a low power consumption analog receiver. The terminal may further report information of the supported power saving signal, and the number of bits used may be 1 bit or a plurality of bits, for example, the bit value of 0 is used to indicate that the terminal supports the power saving signal based on the PDCCH, a bit value of 1 is used to indicate that the terminal supports the power saving signal based on a sequence; or a bit value of 00 indicates that the terminal supports a power saving signal of a PDCCH type based on a baseband receiver, a bit value of 01 indicates that the terminal supports a power saving signal based on a low power consumption analog receiver. The power-saving-signal indication information may also be used to indicate whether a power saving signal used for other purposes needs to be configured or supported, for example, a bit 1 indicates that the terminal supports receiving a power saving signal used for beam management within DRX OFF, the power saving signal may be used for the UE to select reception beam information used to receive a signal from the base station, or may be used to indicate that the terminal is capable of selecting, according to a power saving signal within DRX OFF, beam information sent by the base station, and reporting the selected beam information.

When the terminal is capable of supporting multiple types of power saving signals, the terminal may report, to the base station, one or more types of power saving signals preferred by the terminal, or information of all power saving signals supported by the terminal. The base station configures through the RRC signaling semi-statically information of a power saving signal needing to be received by the terminal, according to a location change of the UE such as a distance change with respect to a base station within a serving cell, or a received RSRP/RSRQ condition, or a mobile condition in which the terminal is located, or a frequency band accessed by the UE. When a distance between the terminal and the base station is smaller than a first threshold (in this case, the terminal is closer to the base station), the base station indicates the terminal to use the power saving signal based on a lower-power-consumption radio-frequency analog receiver. If the distance between the terminal and the base station is great than a second threshold (in this case, the terminal is far away from the base station), the base station instructs the terminal to use the power saving signal based on the baseband receiver, wherein the first threshold is smaller than the second threshold.

As another example, in a low frequency band, the base station may instruct the UE not to receive a power saving signal for beam selection within DRX OFF. In a high frequency band, the UE may receive the power saving signal within the DRX OFF duration for select a beam and/or report the best beam. Preferably, the base station may semi-statically configure information of the power saving signal used by the terminal, and the base station may also, dynamically through the MAC CE or the PDCCH, indicate information of the power saving signal needing to be received by the terminal. Sometimes, there is only one type of a power saving signal to be reported by the terminal or even if the terminal does not report the power-saving-signal indication information to the base station (in this case, it is required that there is pre-agreed information between the base station and the terminal), the base station may also send configuration information of the power saving signal to the terminal to notify the terminal to perform detection of the power saving signal.

In the above method, the base station may, based on the power-saving-signal indication information sent by the terminal, send the power saving signal to the terminal according to requirement when the terminal supports the reception of the power saving signal. Thus, transmission of the power saving signal based on characteristics of the terminal itself is realized. In addition, in the above embodiment, the power saving signal based on the radio frequency analog receiver may be adopted, and in this way, the power consumption of the terminal when receiving the power saving signal may be greatly reduced.

Figure 6:
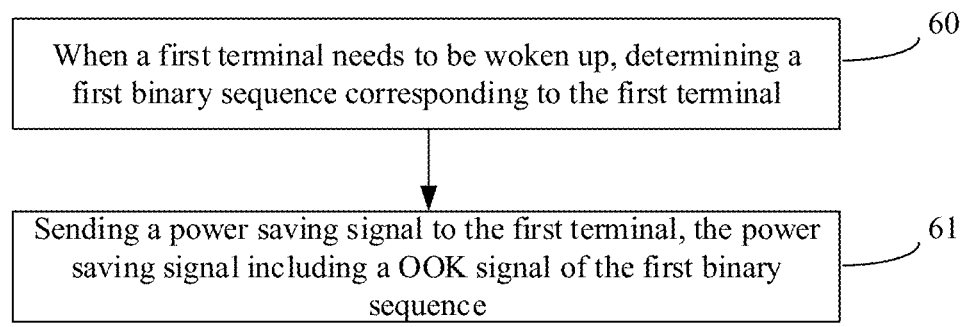
FIG. 6 is another flowchart of a method of transmitting a power saving signal according to some embodiments of the present disclosure.

Referring to FIG. 6, some embodiments of the present disclosure provide another method of transmitting a power saving signal. This method is applied to a base station. The base station includes Steps 60 and 61.

Step 60: when a first terminal needs to be woken up, determining a first binary sequence corresponding to the first terminal.

Step 61: sending a power saving signal to the first terminal, wherein the power saving signal includes an On Off Key (OOK) signal of the first binary sequence.

Through the above steps, the base station of some embodiments of the present disclosure adopts the OOK signal of the binary sequence as the power saving signal, so that a receiving terminal can utilize a radio frequency analog receiver, the power saving signal is directly received in a radio frequency domain without activating a baseband module of the terminal, so that the power consumption of the terminal for receiving the power saving signal can be greatly reduced.

Here, correspondence relationship between the terminal and the binary sequence may be defined by a standard or configured by the base station to the terminal. In this way, both the base station and the terminal can determine the binary sequence corresponding to the terminal according to the correspondence relationship. Of course, in some embodiments of the present disclosure, the base station may also determine the binary sequence corresponding to the terminal and notify the binary sequence to the terminal, which is not particularly limited by some embodiments of the present disclosure.

Optionally, the binary sequence corresponding to the terminal may be determined based on information such as a wake up area ID (a wake up area is an area where the terminal is located) and a wake up ID of the terminal.

Optionally, before step 60 in some embodiments of the present disclosure, the base station may further receive the power-saving-signal indication information reported by the first terminal, the power-saving-signal indication information is at least used to indicate that the first terminal supports or does not support reception of the power saving signal. When the power-saving-signal indication information indicates that the first terminal supports the reception of the power saving signal, the above step 60 is entered. Optionally, the power-saving-signal indication information may further indicate at least one of the following information: a type of a power saving signal supported by the first terminal, wherein types of power saving signals include a power saving signal based on a digital baseband receiver, a power saving signal based on a radio frequency analog receiver, a power saving signal based on a sequence, and a power saving signal based on a PDCCH; whether the first terminal needs to configure or support additional usage of the power saving signal, wherein the additional usage includes beam management during a DRX OFF duration.

Optionally, in some embodiments of the present disclosure, the base station may also send, to the first terminal before step 61, configuration information of the power saving signal needing to be received by the first terminal, the configuration information includes at least the type of a power saving signal needing to be received by the first terminal. For example, the base station may, when the power-saving-signal indication information indicates that the first terminal supports multiple types of power saving signals, determine the type of the power saving signal needing to be received by the first terminal, according to at least one of following pieces of state information of the first terminal: location change information of the first terminal; reception quality information of a signal of the first terminal; a movement state of the first terminal; an access frequency band of the first terminal.

Optionally, the configuration information further includes indication information of a first binary sequence corresponding to the first terminal, and the indication information may directly indicate a specific first binary sequence, or the indication information may also indicate a manner in which the first binary sequence is generated or determined.

In practical applications, the base station may overlap the power saving signals of a plurality of terminals for transmission. In this case, in the above step 61, the base station may perform binary time-domain waveform modulation on a binary sequence corresponding to each of at least one terminal to be woken up including the first terminal, and obtains the OOK signal of the binary sequence, and then superposes OOK signals of binary sequences obtained after the modulation and transmits the superposed OOK signals; or, the base station first superposes respective binary sequences corresponding to the at least one terminal to be woken up including the first terminal, and then modulates a time domain waveform of a OOK signal with respect to a result of the superimposition, and then transmits the OOK signal.

In order to facilitate the terminal to detect a binary sequence when binary sequences of a plurality of terminals are superposed in frequency domain, in some embodiments of the present disclosure, the base station may further, before step 61, send a pre-configured or pre-agreed reference OOK signal of a binary sequence to the first terminal. Here, the binary sequence may be defined by a standard, or pre-agreed between the base station and the terminal, or pre-configured by the base station to the terminal. In this way, the terminal can obtain a reference value of a single-level amplitude by detecting the reference OOK signal of the binary sequence, and then perform multi-level detection of the power saving signal accordingly.

In some embodiments of the present disclosure, the binary sequence (i.e., the power saving signal of the terminal) corresponding to the terminal may be used to carry various kinds of information, such as a wake up area ID and/or a wake up ID.

Optionally, the wake up area ID may be an identifier corresponding to a preset wake up area. The preset wake up area may be a coverage area of a single cell or a plurality of cells. Each wake up area ID corresponds to a plurality of binary sequences, i.e. these binary sequences have the same wake up area ID. Preferably, the correspondence relationship between a sequence group and a wake up area ID may also be a preset function which takes time as a parameter, for example, one function which takes an index of a time slot (e.g., a starting time slot) of power saving signal transmission opportunity as a parameter, so that interference of the power saving signals between sequence groups can be randomized. The wake up ID may be an identifier for determining the terminal to which the binary sequence corresponds. For example, for a plurality of terminals in the same wake up area, the wake up ID of each terminal is determined, and correspondence relationship between the binary sequence and the wake up ID of the terminal in the wake up area is established.

In the above step 60, the base station needs to determine the first binary sequence corresponding to the first terminal. Some embodiments of the present disclosure provide various implementations of a binary sequence corresponding to a terminal.

A) As an implementation, in some embodiments of the present disclosure, a plurality of pre-selected binary sequences may be grouped to obtain a plurality of sequence groups, correspondence relationship between sequence groups and wake up area IDs are established, wherein each sequence group corresponds to a wake up area ID. Then, correspondence relationship between a binary sequence in each sequence group and a wake up ID of the terminal in the sequence group is established, wherein each sequence in a sequence group corresponds to a wake up ID, the plurality of binary sequences is an orthogonal sequence (such as a Hadamard/Walsh sequence) or a pseudo-random sequence (such as a gold sequence). Then, the binary sequence corresponding to the terminal is determined according to the correspondence relationship between the binary sequence in each sequence group and the wake up ID of the terminal.

Corresponding to the implementation mode, in the above step 60, the base station may, according to the pre-established correspondence relationship between sequence groups and wake up area IDs, determine a first sequence group corresponding to the wake up area ID of the first terminal, and according to pre-established correspondence relationship between a binary sequence in the sequence group and the wake up ID, determine a first binary sequence corresponding to a wake up ID of the first terminal in the first sequence group.

In this implementation, binary sequences within different sequence groups are different from each other, which can well avoid signal interference between different wake up areas. Some embodiments of the present disclosure may also employ partially identical binary sequences among different sequence groups in view of the limited number of binary sequences and a fact that there is typically geographical isolation of wake up areas. For example, the plurality of sequence groups may be divided into at least two sets, each set includes at least one sequence group, and binary sequences within sequence groups within the same set are different from each other, and two sequence groups from different sets have at most one identical sequence.

Further, some embodiments of the present disclosure may also utilize a binary sequence of a power saving signal to transmit more information. For example, the sequence group may be further divided into a plurality of sub-groups, each sub-group corresponds to a set of terminal state parameters, the set of terminal state parameters includes time domain resource information for transmitting a power saving signal and other predefined information.

For example, a preferred implementation of a modulation signal corresponding to a binary sequence is an On Off Key (OOK) signal. In classical digital communication, the OOK signal is based on a sequence of binary values, i.e., each value is either 0 or 1, in which a bit 1 corresponds to sending a time domain modulation waveform u (t), and a bit 0 corresponds to sending no signal.

In order to support power saving signals corresponding to different UEs to be able to multiplex the same time-frequency resources, suitablee binary sequences have better cross-correlation. A preferred OOK-based binary sequence is an orthogonal sequence. In the follow, the Hadamard sequence or the Walsh sequence is taken as an example. In a conventional sense, each element of the Hadamard sequence/Walsh sequence has a value of +1 or −1 (such as applied to CDMA spreading sequences). In some embodiments of the present disclosure, each element of the original Hadamard sequence/Walsh sequence is linearly transformed into an element having a value of either 0 or 1 based on an OOK signal.

Taking a Hadamard sequence with a length of 256 as an example, $x_j=[x_1, x_2, \ldots x_N] x_i \in \{0,1\}, j=1, 2, \ldots, N, N=256$, and it is assumed that transmission is completed within 1 ms, i.e., the number of Hadamard sequences with a length of N=256 corresponding to OOK signals of 256K is equal to N. M sequences out of the N=256 sequences can be divided into G groups, wherein M is equal to or less than N (where N-M sequences are discarded). The index of each group corresponds to a wake up area ID, and each sequence in the group corresponds to a wake up ID for waking a user having an identifier of the wake up ID.

If G=30 groups, M=255, then the number of sequences in each group are 9 or 8; if G=30, M=240, then the number of sequences in each group is 8, which can support terminals having 8 wake up IDs to be woken up on the same resource at the same time. As another example, N=256 Hadamard sequences, assuming that G=19 and M=256, then each group contains 13 or 14 sequences after grouping is performed. Each set of sequences may be used to simultaneously wake up 13 or 14 terminals having the wake up IDs on the same resource. The above grouping method is characterized in that sequences within each group are different from each other, a group number is used for representing the wake up area ID, and a sequence within the group is used for representing a wake up ID.

The grouping method of sequences can also support presence of the same users in different groups, and support more sequences in a group on the same time-frequency resources to wake up g more users at the same time. Still assuming that G=30, N=256, M=255, and that the number of sequences in one group is desired to be at least 15 or 16, then M sequences are first divided into 16 groups, and the same sequence notation as described above is adopted. For example, a first group has 15 sequences numbered as Group$_1$={$x_2$, $x_3$, $x_4$, ... $x_{16}$}, a second group is Group$_2$={$x_{17}$, $x_{18}$, $x_{19}$, ... $x_{32}$}, ..., a sixteenth group is Group$_{16}$={$x_{241}$, $x_{242}$ $x_{243}$, ... $x_{256}$} and the sequences within the 16 groups are different from each other. A seventeenth group is Group$_{17}$={$x_2$, $x_{18}$, $x_{34}$, ... $x_{242}$} an eighteenth group is Group$_{17}$={$x_3$, $x_{19}$, $x_{35}$, ... $x_{243}$}, ..., a thirtieth group is Group$_{30}$={$x_{15}$, $x_{31}$, $x_{47}$, ... $x_{255}$}, wherein $x_1$ is discarded due to values of $x_1$ are all 0 and therefore discarded. Therefore, sequences in the 14 groups are from different groups, and sequences in the last 14 groups are different from each other, and only one sequence is the same between the 16 groups and any two groups in the last 14 groups. The above is only a specific example. This grouping method is characterized in that sequences are first divided into a plurality of group sets, the group number is used to indicate a wake up area ID, the sequences in a group is used to represent a wake up ID, the sequences between groups in each group set are different from each other, and two groups from different group sets have at most one same sequence.

The purpose of grouping sequences is to avoid interference among different wake up areas, e.g. two adjacent cells need to use different sequence groups as much as possible. However, when the number of sequences supported within each group is significant, sequence collisions will occur among different groups as described above, which will increase a false alarm probability of waking up. Correspondence relationship between the group number of the power saving signals and wake up area IDs may vary with time, for example, may be related to a slot index of a starting time slot of a power-saving-signal transmission opportunity. A simple method is that a sequence group index corresponding to a wake up area ID is equal to mod (f (wake up area ID)+slot index, G), where f is a function. This has an advantage of randomizing interference among power saving signals. Each group may be further grouped, and each sub-group may be used to represent other information for the UE.

The network side performs binary time-domain waveform modulation on one or more binary sequences in the sequence group corresponding to the wake up area ID, and then superposes the modulated binary sequences for transmission, or first superposes the binary sequences and then performs time-domain waveform modulation on a result of the superposition for transmission.

In the above description, a sequence for generating a Radio-Frequency (RF)-receiver based low-power consumption power saving signal is obtained based on grouping orthogonal binary sequences, the same applies to other binary sequences with good cross-correlation, such as a gold sequence.

B) As another implementation, in some embodiments of the present disclosure, information (such as a wake up area ID and/or a wake up ID) needing to be carried by an OOK signal of a target binary sequence is taken as a generation parameter for the binary sequence, and the target binary sequence corresponding to the terminal (e.g., the first terminal) is generated.

Specifically, in the above step 60, the base station may generate the first binary sequence corresponding to the first terminal by using wake-up information of the first terminal as a generation parameter for the binary sequence, the wake-up information includes a wake up area ID and/or a wake up ID.

For example, when the binary sequence is a gold sequence c(n) generated based on a first M sequence $x_1(n)$ and a second M sequence $x_2(n)$, initial values of the first M sequence $x_1(n)$ and the second M sequence $x_2(n)$ may be a function of one or more of the following parameters: wake up area ID, wake up ID and other parameters, the other parameters may include time domain resource information or other predefined information for transmitting the power saving signal.

In the above implementation A, the RF-received-based low-power-consumption power saving signal corresponding to a certain UE is obtained based on binary sequence groups with good cross-correlation. In this implementation B, rather than grouping the sequences, the information needing to be carried by the power saving signal is directly taken as a Pseudo-Noise (PN) sequence, for example, as an input of a gold sequence, and a binary sequence corresponding to the power saving signal corresponding to the UE is generated therefrom, then the network side performs binary time-domain waveform modulation on one or more binary sequences corresponding to the wake up area ID and the wake up ID, respectively and then superposes the result of the modulation for transmission, or the network side first superposes the binary sequences and then performs time-domain waveform modulation on the result of the superposition as power saving signals for waking up one or more UEs.

As a specific example, a gold sequence c (n) with a register length of 31 for a downlink reference signal in NR standard is defined as follows:

$c(n)=(x_1(n+N_C)+x_2(n+N_C))\bmod 2$ $x_1(n+31)=(x_1(n+3)+x_1(n))\bmod 2$ $x_2(n+31)=(x_2(n+3)+x_2(n+2)+x_2(n+1)+x_2(n))\bmod 2$ where $N_C=1600$.

The first sequence $x_1(n)$ in the standard can be initialized to $x_1(0)=1$, $x_1(n)=0$, $n=1, 2, \ldots, 30$. The second sequence $x_2(n)$ can be initialized to $c_{init} = \sum_{i=0}^{30} x_2(i) \cdot 2^i,$ depending on a specific application scenario.

When the sequence is used as a power saving signal, initial values of the two M-sequences may be functions of the wake up ID, the wake up area ID, and other information. If the wake up area ID and the wake up area ID is a function of the initial value of the same M sequence, for example, an initialization value of the second M sequence $C_{init}=(2^{15} \cdot$ (Wake up ID+t)+wake up area ID) mod $2^{31}$, where t is a time domain resource identifier of transmission of the power saving signal, such as the index of a starting slot. Similarly, the initial value of the first M sequence may also be other functions of the time domain resource identifier (such as the index of the starting slot) of transmission of the power saving signal.

The network side performs binary time-domain waveform modulation on one or more binary sequences corresponding to the wake up area ID and/or the wake up ID, and then superposes the modulated sequences for transmission, or the network side first superposes the binary sequences and then modulates a time-domain waveform for the result of the superposition, and transmits the time-domain waveform for the power saving signal. Difference between this case and an existing downlink reference signal is that a PN sequence based on the gold sequence of the present embodiment is not frequency domain data, but time domain data, and does not require a Discrete Fourier Transformation (DFT) operation, and does not need multi-carrier modulation, but is directly modulated into a time-domain OOK waveform, a detection end is in a RF domain and thus is completely different from baseband processing process, since there is no complex processing process, the baseband processing module is not activated. Thus, the power consumption in the present embodiment is extremely low.

C) As yet another implementation, in some embodiments of the present disclosure, one or more sequence groups corresponding to a terminal may be determined according to a wake up area ID corresponding to the terminal, wherein each sequence group includes at least two binary sequences. For example, the sequence groups may be numbered, and then the wake up area ID corresponding to the terminal may be associated with the numbering value of a certain sequence group according to a preset functional relationship (such as a modulo function). Thus, the correspondence relationship between a wake up area ID and sequence groups can be established in advance. Then, the binary sequence corresponding to the terminal in the sequence group corresponding to the terminal is determined according to the wake up ID and/or additional indication information of the terminal, wherein, the binary sequence corresponding to the terminal is a multi-stage sequence consisting of a plurality of single-stage sequences cascaded, each of the multi-stage sequence is a binary sequence in the sequence group corresponding to the terminal, or is obtained by superposing the plurality of binary sequences in the sequence group corresponding to the terminal. The additional indication information may include time domain resource information of a transmission channel and other information.

Corresponding to this implementation, in the above step 60, the base station may, according to the pre-established correspondence relationship between a sequence group and a wake up area ID, determine a first sequence group corresponding to the wake up area ID of the first terminal; according to pre-established correspondence relationship between the multi-stage sequence in each sequence group and the wake up ID, determine a first multi-stage sequence corresponding to the wake up ID of the first terminal to obtain the first binary sequence, wherein the multi-stage sequence within each sequence group is a sequence consisting of a plurality of single-stage sequences cascaded, the single-stage sequence is one binary sequence in the sequence group, or is obtained by superposing a plurality of binary sequences within the sequence group.

Here, by providing a form of a multi-stage sequence, the number of multi-stage sequences combined can be expanded when the number of sequences in a sequence group is limited, it is thus possible to indicate more terminals or to carry more information with the multi-stage sequence. Here, in some embodiments of the present disclosure, a plurality of single-stage sequences is cascaded to obtain the multi-stage sequence, specifically, cascaded in time domain or in frequency domain.

Similarly, in this implementation, each sequence group may also be obtained by grouping a plurality of binary sequences. For example, a plurality of pre-selected binary sequences are grouped to obtain a plurality of sequence groups, and correspondence relationship between the sequence groups and the wake up area IDs is established. An index of each sequence group corresponds to a wake up area ID, wherein each sequence group includes at least two binary sequences which are orthogonal sequences or pseudo-random sequences. Correspondence relationship between the multi-stage sequence in each sequence group and the wake up ID is established, wherein, each single-stage sequence in the multi-stage sequence is a binary sequence in the sequence group with the same index, or is obtained by superposing a plurality of binary sequences in the sequence group.

Here, each single-stage sequence in the multi-stage sequence is a binary sequence in the sequence group with the same index, or is obtained by superposing a plurality of binary sequences in the sequence group. Specifically, the binary sequences within a respective sequence group are different from each other, or the plurality of sequence groups may be divided into at least two sets, each set includes at least one sequence group, and the binary sequences in the sequence groups within the same set are different from each other, and two sequence groups from different sets have at most one same sequence.

In the implementation A/B, the time-domain binary sequence are all single-stage sequence. In this implementation C, the multi-stage sequence is introduced for supporting that more terminals of wake up IDs can be woken up at the same time with the same time-frequency resource, or more other information can be carried. The multi-stage sequence is obtained by cascading multiple single-stage sequences, and the multi-stage sequence commonly corresponds to the power saving signal. A specific example of the multi-stage sequence is as follows: as described in implementation A, m sequences of N (orthogonal) sequences are divided into G groups, wherein the index of a group corresponds to the wake up area ID, a sequence in the group corresponds to a wake up ID, and superposition of one or more sequences in the same group forms a first-stage sequence; a second-stage sequence has the same group index as that of the first-stage sequence, superposition of one or more sequences within the group constitutes the second stage sequence. For example, N=128, M=128, the number of groups is G=19, and the number of sequences per group is 6 or 7. It is assumed that the group index corresponding to the current wake area ID is 6 (group index=6), the group includes 7 sequences. Thus, OOK signals of the two stages of sequences are composed of sequences in the group with index=6, the first-stage sequence supports 7 sequences at most, and the second-stage sequence also supports 7 sequences at most. The number of indices composed of the two stages of sequences is 49, for example, the sequence index in the first-stage sequence=0, 1, 2, 3, 4, 5, 6, and the sequence index in the second-stage sequence is also 0, 1, 2, 3, 4, 5, 6. The number of indices of the two stages of sequences supported is 7*7=49. For example, [0 6] indicates a two-stage sequence composed of a first sequence of the first-stage sequence and a seventh sequence of the second-stage sequence. In this way, the same two-stage sequence with a total length of 256 can simultaneously support 19 wake up area IDs and 49 wake up IDs on the same resource. A single-stage sequence with a length of 256 is divided into 19 groups, each group can support at most ceil(256/19)=14 different sequences, that is, at most 14 wake up IDs. The above is just an example of a two-stage sequence, more stages can be supported as needed, but the group index of a N-stage sequence must be consistent with the group index of the previous first-stage sequence as described above. The multi-stage sequence to be explained provides more sequence combinations under the same wake up area IDs, in addition to being able to represent more wake up IDs, more other power saving information, for example, the time-domain resource information of a transmission channel of a power saving signal may also be represented.

The method of transmitting the power saving signal of some embodiments of the present disclosure has been described above from the base station side. Hereinafter, description will be made from that terminal side.

Figure 7:
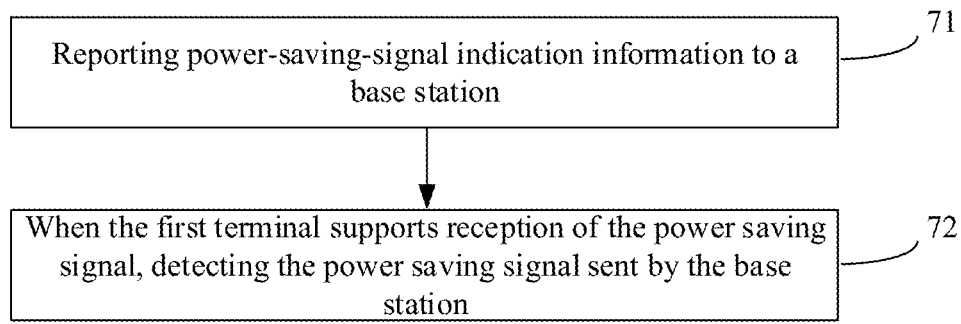
FIG. 7 is another flowchart of a method of detecting a power saving signal according to some embodiments of the present disclosure.

Referring to FIG. 7, some embodiments of the present disclosure provide a method of detecting a power saving signal. The method is applied to a first terminal. The method includes Steps 71-72.

Step 71: reporting power-saving-signal indication information to a base station, wherein the power-saving-signal indication information is at least used to indicate that the first terminal supports or does not support reception of the power saving signal.

Step 72: when the first terminal supports reception of the power saving signal, detecting the power saving signal sent by the base station.

Here, correlation detection in a radio frequency domain may be performed, according to a first binary sequence corresponding to the first terminal, on the power saving signal sent by the base station, wherein, the power saving signal includes an On Off Key (OOK) signal of the first binary sequence when being used to wake up the first terminal.

In the above manner, the first terminal can actively report the power-saving-signal indication information to the base station, which is beneficial for the base station to pertinently send the power saving signal. In addition, by detecting the power saving signal in the radio frequency domain, a baseband module of the terminal can be avoided from being woken up, so that the power consumption of the reception of the power saving signal can be greatly reduced.

In the above step 72, if the power saving signal corresponding to the first terminal is detected, the first terminal may perform monitoring of a PDCCH, for example, waking up the baseband module to monitor the PDCCH.

In some embodiments of the present disclosure, the power-saving-signal indication information is further used to indicate at least one of the following information: a type of a power saving signal supported by the first terminal, wherein types of power saving signals include a power saving signal based on a digital baseband receiver, a power saving signal based on a radio frequency analog receiver, a power saving signal based on a sequence, and a power saving signal based on a PDCCH; whether the first terminal needs to configure or support additional usage of the power saving signal, wherein the additional usage includes beam management during a DRX OFF duration.

After sending the power-saving-signal indication information in the above step 71, the base station may also configure reception of the power saving signal to the terminal. In this case, the first terminal may also receive the configuration information, sent by the base station, of the power saving signal needing to be received by the first terminal, for example, receive the configuration information, sent semi-statically by the base station through a RRC signaling, of the power saving signal needing to be received by the first terminal, and/or receive the configuration information, dynamically sent by the base station through a Medium Access Control Control Element (MAC CE) or a PDCCH, of the power saving signal needing to be received by the first terminal.

Optionally, in some embodiments of the present disclosure, the OOK signal of the binary sequence may be used as the power saving signal, so that detection to a time-domain signal may be directly performed in the RF domain without activating a baseband module of the terminal, so that the power consumption for receiving the power saving signal can be greatly reduced. In this case, in the above step 72, correlation detection may be performed, in the radio frequency domain according to the first binary sequence corresponding to the first terminal, on the power saving signal sent by the base station, wherein, the power saving signal includes the On Off Key (OOK) signal of the first binary sequence when being used to wake up the first terminal.

Optionally, in some embodiments of the present disclosure, before the above step 72, the first terminal may further receive the configuration information, sent by the base station, of the power saving signal needing to be received by the first terminal, the configuration information includes at least the type of a power saving signal needing to be received by the first terminal. Further, the configuration information may further include indication information of the first binary sequence. Thus, before the above step 72, the first terminal may further determine the first binary sequence corresponding to the first terminal according to the configuration information.

The configuration information may be semi-statically configured and/or dynamically configured. Correspondingly, the first terminal may receive the configuration information, semi-statically sent by the base station through a Radio Resource Control (RRC) signaling, of the power saving signal to be received by the first terminal, and/or receive configuration information, dynamically sent by the base station through the MAC CE or the PDCCH, of the power saving signal needing to be received by the first terminal.

In some embodiments of the present disclosure, the binary sequence corresponding to each terminal may carry information of the wake up area ID and/or the wake up ID.

A) corresponding to the implementation of the binary sequence corresponding to the terminal provided by the base station side in the above, before the above step 72, the first binary sequence corresponding to the first terminal may also be determined through the following steps: determining a first binary sequence group corresponding to the wake up area ID of the first terminal according to the pre-established correspondence relationship between a sequence group and a wake up area ID, and determining the first binary sequence corresponding to the wake up ID of the first terminal in the first sequence group according to pre-established correspondence relationship between the binary sequence in the sequence group and the wake up ID.

Here, the first terminal and the base station may group a plurality of pre-selected binary sequences according to the same rule to obtain a plurality of sequence groups, and establish correspondence relationship between the sequence groups and the wake up area IDs, wherein each sequence group corresponds to a wake up area ID, wherein, the plurality of binary sequences are orthogonal sequences or pseudo-random sequences, and establish correspondence relationship between the binary sequences within each sequence group and the wake up IDs of the terminal within the sequence group.

The binary sequences within different sequence groups are different from each other, or the plurality of sequence groups are divided into at least two sets, each set includes at least one sequence group, and the binary sequences in the sequence groups within the same set are different from each other, and two sequence groups from different sets have at most one same sequence. Specifically, the correspondence relationship between the sequence groups and the wake up area IDs is a preset function with time as a parameter.

In addition, optionally, the sequence group may be further divided into a plurality of sub-groups, each sub-group corresponds to a set of terminal state parameters, the set of terminal state parameters includes time domain resource information for transmitting a power saving signal and other predefined information.

B) corresponds to another implementation of the binary sequence corresponding to the terminal provided by the base station side in the above, and before the above step 72, the first binary sequence corresponding to the terminal may also be determined according to the following steps: taking wake-up information of the first terminal as a generation parameter of the binary sequence to generate the first binary sequence corresponding to the first terminal, wherein the wake-up information includes a wake up area ID and/or a wake up ID.

For example, when the binary sequence is a gold sequence $c(n)$ generated based on a first M sequence $x_1(n)$ and a second M sequence $x_2(n)$, initial values of the first M sequence $x_1(n)$ and the second M sequence $x_2(n)$ may be a function of one or more of the following parameters: wake up area ID, wake up ID and other parameters, the other parameters may include time domain resource information for transmitting the power saving signal.

C) corresponding to yet another implementation of the binary sequence corresponding to the terminal provided by the base station side in the above, before the above step 72, the first binary sequence may also be determined according to the following steps: according to the pre-established correspondence relationship between a sequence group and a wake up area ID, determining a first sequence group corresponding to the wake up area ID of the first terminal; according to pre-established correspondence relationship between the multi-stage sequence in each sequence group and the wake up ID, determining a first multi-stage sequence corresponding to the wake up ID of the first terminal to obtain the first binary sequence, wherein the multi-stage sequence within each sequence group is a sequence consisting of a plurality of single-stage sequences cascaded, the single-stage sequence is one binary sequence in the sequence group, or is obtained by superposing a plurality of binary sequences within the sequence group.

Here, the first terminal and the base station may group a plurality of pre-selected binary sequences according to the same rule to obtain a plurality of sequence groups, and establish the correspondence relationship between the sequence group and the wake up area ID, wherein the index of each sequence group corresponds to one wake up area ID, each sequence group includes at least two binary sequences, the plurality of binary sequences are orthogonal sequences or pseudo-random sequences, and establish the correspondence relationship between the multi-stage sequence within each sequence group and the wake up ID, wherein, each single-stage sequence in the multi-stage sequence is a binary sequence in the sequence group of the same index, or is obtained by superposing a plurality of binary sequences in the sequence group of the same index.

Optionally, the binary sequences within the sequence groups are different from each other, or the plurality of sequence groups are divided into two sets, each set includes at least one sequence group, and the binary sequences in the sequence groups within the same set are different from each other, and two sequence groups from different sets have at most one same sequence.

In some embodiments of the present disclosure, since the base station may superpose the power saving signals of a plurality of terminals and transmit the superposed power saving signals, before the above step 72, in order to detect the binary sequences of one or more terminals included in the power saving signals, the first terminal may further receive a pre-configured or pre-agreed reference OOK signal of a binary sequence sent by the base station, and acquire a single-level reference amplitude of the reference OOK signal; and then in the process of detecting the power saving signal sent by the base station in step 72, perform multi-level detection, in the radio frequency domain according to the single-level reference amplitude, on the power saving signal sent by the base station, and obtain a multi-level detection signal y.

Specifically, in the multi-level detection process, since the network side generates binary digital sequences with good cross-correlation according to a predetermined manner, one or more binary sequences are respectively subjected to binary time-domain waveform modulation and then superposed for transmission, or the binary sequences are first superposed and then time-domain waveform modulation is performed on the result of the superposition and the modulated superposed sequences are transmitted. The superposed signals are different from the classical binary OOK signal, and is a non-binary OOK signal, and has multiple levels to be detected by the receiving end. Hence, the power saving signals based on a low-power-consumption RF receiver may consist of at least two parts, one of which is the low-power-consumption power saving signal for waking up the terminal as previously described, the other of which is a reference binary OOK signal agreed between a base station and a terminal, for example, a sequence corresponding to the reference binary OOK signal may be cell specific, for example, it may be generated by a method similar to that for the LTE CRS, or it may be a known sequence for the UE needing to be woken up on current resources within a cell, and the sequence may be statically/semi-statically configured by the base station, such as semi-statically configured by a RRC signaling, of course, the sequence may also be dynamically configured by using MAC CE. The reference binary OOK signal is known to all terminals receiving the power saving signals on the current resource, and there are only 1 and 0 in the sequence. The UE may regard a known binary OOK signal as a pilot for the terminal to estimate the single-level amplitude, thereby performing the multi-level detection on the received power saving signal in the radio frequency (RF) domain to obtain a multi-level judgment value.

Therefore, preferably, the base station may transmit a binary OOK signal known to the receiving end before the low-power-consumption power saving signal used for waking up the terminal, for purpose of subsequently performing multi-level detection based on the multi-level power saving signal. Of course, as previously mentioned, the known binary OOK signal can be regarded as a constituent part of the power saving signal. There are various ways to obtain an amplitude estimate value y of the received signal based on a single-level amplitude estimate of the binary known OOK and then perform multi-level detection on the estimate value, for example, following cases 1)-4).

1) Decimal reception: the received sequence y is the result of the transmitted sequence added with noise, and a value in the sequence y is a decimal number, so the correlation is directly calculated, which is an ideal case.
2) Integer number reception: considering that a result outputted by an OOK receiver during multi-level detection may be an integer, the received decimal sequence is quantized and rounded, that is, round (y), and correlation is calculated using an integer.
3) Integer reception+negative value zeroing: a negative value will appear after the received sequence is quantized to an integer, but a detection result for an envelope detector does not contain a negative value, so it is assumed that the detector can identify the negative value and zero it. That is, the following processing is performed for rx=round (y), rx (rx<0)=0.
4) Integer reception+negative value changed to a positive value: a general envelope detector can only detect an amplitude, so a negative value will be directly detected as a positive value, i.e. rx=abs (round (y)).

Next, some embodiments of the present disclosure also provide a specific implementation of correlation detection.

In step 72, when detecting the power saving signal transmitted by the base station, the first terminal may utilize the following normalized cross-correlation function to perform correlation detection on the target binary sequence x and the multi-level detection signal y obtained by detecting, in the radio frequency domain, the power saving signal sent by the base station, wherein the normalized cross-correlation function $\rho(x, y)$ is:

$$\rho(x, y) = \frac{T}{N}\sum_{i=1}^{N}(1 - 2x_i) - \frac{2}{N}\sum_{i=1}^{N}(1 - 2x_i)y_i$$

wherein the target binary sequence is $x=[x_1, x_2, \ldots x_N]$, $x_i \in \{0,1\}$; the multi-level detection signal $y=[y_1 y_2, \ldots y_N]$; T is the number of binary sequences superposed in the multi-level detection signal.

In order to simplify a calculation amount for the detection, when the binary sequences superposed in the multi-level detection signal are all balanced sequences, the correlation detection may be performed after the value of $$\frac{T}{N}\sum_{i=1}^{N}(1 - 2x_i)$$

in the normalized cross-correlation function $\rho(x, y)$ is 0. For example, for the Hadamard sequence, the M sequence or the balanced gold sequence, the binary normalized cross-correlation function of the sequence can be simplified as:

$$\rho(x, y) = -\frac{2}{N}\sum_{i=1}^{N}(1 - 2x_i)y_i,$$

When the binary sequences superposed in the multi-level detection signal include an unbalanced sequence, correlation detection is performed after an average amplitude value (e.g., an average amplitude value of the multi-level detection signal within a preset time) of the multi-level detection signal is taken as a value of $$\frac{T}{N}\sum_{i=1}^{N}(1-2x_i)$$

in the normalized cross-correlation function ρ(x, y).

When the binary sequences superposed in the multi-level detection signal include an unbalanced sequence, since the OOK signal has only 0 or 1, correlation detection may also be performed after the maximum amplitude value ((e.g., a maximum amplitude value of the multi-level detection signal within a preset period of time) of the multi-level detection signal is taken as the value of Tin the normalized cross-correlation function ρ(x, y).

Here, it should be noted that the balanced sequence of some embodiments of the present disclosure means that the number of 0 and the number of 1 in the sequence are equal or difference between the number of 0 and the number of 1 in the sequence is at most a predefined value (the value is usually smaller, such as 1). For example, the Hadamard sequence after an all-0 sequence being discarded may be a balanced sequence as described in some embodiments of the present disclosure.

It can be seen that, in order to save power consumption, in some embodiments of the present disclosure, detection of the OOK signal in the radio frequency domain only requires the UE to detect in the RF domain instead of in the baseband domain, the terminal first detects according to the superposed OOK signals. When the number of OOK signals superposed on the same time-frequency resource is greater than 1, the receiving end performs multi-level detection, and after performing multi-level judgment, the original transmission sequence for waking up the corresponding UE needs to be detected from the superposed sequences. Sequence detection algorithms known in the related art are all based on a digital domain, in the digital domain, each element of each binary sequence to be detected has a value of +1 or −1. For an OOK signal, when an element in the sequence is 0, the base station does not transmit any signal, so sequence detection needs to address how to perform correlation detection based on binary signals of either 0 or 1. When performing the sequence detection, the terminal needs to perform correlation detection on a locally known binary sequence and a digital sequence obtained after the multi-level judgment for the received power saving signal, a manner of the detection provided by some embodiments of the present disclosure is described in detail below:

Assuming that a local binary sequence at the terminal is $x=[x_1, x_2, \ldots x_N]$, $x_i \in \{0,1\}$, the multi-level sequence at the receiving end is $y=[y_1 \, y_1, \ldots y_N]$. If the noise is ignored, then $$y_i = \sum_{j=1}^{T} z_i^j, z_i^j \in \{0, 1\},$$

T is the number of OOK signals superposed at the sending end, that is, the number of users who need to be woken up at the same time, and $z_i^j$ is a value of a j-th OOK signal at an i-th position.

Then the local normalized cross-correlation function for x and y is:

$$\rho(x, y) = \frac{T}{N}\sum_{i=1}^{N}(1-2x_i) - \frac{2}{N}\sum_{i=1}^{N}(1-2x_i)y_i,$$

The above formula is a normalized cross-correlation function. ρ(x, y) can be multiplied by N to obtain a non-normalized cross-correlation function, or an absolute value of ρ(x,y) may be taken, or ρ(x,y) may be multiplied by a constant, or some function operation or estimate value may be performed on the ρ(x, y) to obtain an equivalent form of the cross-correlation function, and the above-mentioned equivalent forms shall fall within the protection scope of the present disclosure.

In the normalized cross-correlation function, Tin the first term, i.e., the number of superposed sequences, is unknown, but for the orthogonal Hadamard sequence, each of the number of 0 and the number of 1 is half of the total number of bits in the sequence other than the all-0 sequence. If the all-zero sequence is not used, then the first term satisfies:

$$\frac{T}{N}\sum_{i=1}^{N}(1-2x_i) = 0$$

So for an OOK signal based on the Hadamard sequence or the Walsh sequence, the normalized cross-correlation function for the sequence is:

$$\rho(x, y) = -\frac{2}{N}\sum_{i=1}^{N}(1-2x_i)y_i$$

For a gold sequence or an M sequence, since it is known that for the M sequence, the difference between the number of 0 and the number of 1 is at most 1; and if a gold code is a balanced code, then the difference between the number of 0 and the number of 1 is at most 1, under this condition $$\sum_{i=1}^{N}(1-2x_i) = 1 \text{ or } -1.$$

Therefore, $$\frac{T}{N}\sum_{i=1}^{N}(1-2x_i) = \pm\frac{T}{N},$$

when M is small, influence on the cross-correlation is not significant (for example, T=8, N=127, T/N=0.0630 or M=8, N=256, T/N=0.0313), thus, this item may be ignored.

Therefore, the following solutions are available.

Solution 1: the binary normalized cross-correlation function for the Hadamard sequence, the M sequence and the balanced gold sequence is:

$$\rho(x, y) = -\frac{2}{N}\sum_{i=1}^{N}(1-2x_i)y_i$$

Solution 2: For an unbalanced gold code, the first term should not be ignored, but the value M can be taken to be a mean value as an estimation, for example, Mmax=8 and Mmean=4.

Solution 3: since the OOK signal has only 0 and 1, the maximum amplitude value that has the highest possibility can be used to estimate the number T of sequences.

In some embodiments of the present disclosure, if the UE detects a power saving signal and a power saving signal corresponding to the UE is detected, then PDCCH monitoring is performed subsequently, a specific monitoring method of the PDCCH monitoring may refer to a related implementation in the related art, and some embodiments of the present disclosure are not particularly limited thereto.

As can be seen from the above, by using the OOK signal of the binary sequence as the power saving signal, the terminal can directly use the radio frequency analog receiver when detecting the power saving signal, correlation detection is performed on the multi-level detection signal in the radio frequency domain, so that the baseband module of the terminal does not need to be activated, the power consumption for detecting the power saving signal can be greatly reduced, and a battery life of the terminal can be improved.

The methods of some embodiments of the present disclosure are respectively explained from the base station side and the terminal side above, and it can be seen that in the above processes.
- a) The terminal may report the indication information of a supported power saving signal to a network side (such as a base station).
- b) The base station may send configuration information of the power saving signal to the terminal according to the indication information of a power saving signal reported by the terminal or pre-agreed information, and the base station may also send the power saving signal according to the indication information of the power saving signal and/or the configuration information of the power saving signal, transmitting the power saving signal to the terminal.
- c) in the method of transmitting the power saving signal or the method of detecting the power saving signal based on the low-power-consumption radio frequency analog receiver in this example, the binary OOK signal may carry at least information of the wake up area ID and/or the wake up ID, the terminal performs correlation detection in the radio frequency (RF) domain, identifies the information of the wake up area ID and/or the wake up ID carried by the OOK signal, and finally determines whether the power saving signal of the terminal is carried.

In addition, some embodiments of the present disclosure provide several specific methods of generating the OOK sequence, for example:

Solution 1: binary digit sequences of a plurality of orthogonal sequences (such as a Hadamard sequence/a walsh sequence) or Pseudo-Random (PN) sequences (such as a gold sequence) are firstly grouped; then each group of binary sequences corresponds to a wake up area ID; then, each sequence within the group corresponds to a wake up ID.

Solution 2: information required to be carried by the power saving signal is taken as the input of a PN sequence (such as a gold sequence) to generate a binary sequence corresponding to the power saving signal of the terminal.

Solution 3: adopting the multi-stage sequence described above as the power saving signal of the terminal.

In the above embodiments, the terminal may correspond to a certain wake up area ID and a certain wake up ID. The network side, such as the base station, may send binary sequences corresponding to one or more terminals (specifically, the wake up area ID and the wake up ID of the terminal). When transmitting the binary sequences corresponding to multiple terminals, the binary time-domain waveform modulation can be respectively performed on the binary sequences corresponding to the terminals and the modulated binary sequences are superposed for transmission, or the binary sequences are first superposed, and then time-domain waveform modulation is performed on the result of the superposition for transmission as power saving signals for waking up one or more terminals. Since the above-described modulation is a time-domain modulation, an Inverse Fast Fourier Transform/Fast Fourier Transform (IFFT/FFT) operation in OFDM communication are not required, whereby processing for reception of the power saving signal at the terminal side can be simplified, there is no need to activate the baseband module, and the power consumption for reception is reduced.

In addition, some embodiments of the present disclosure may also transmit a reference OOK signal known by the receiving end before transmitting the low-power-consumption power saving signal for waking up the terminal, for a purpose of subsequently performing multi-level detection based on the multi-level power saving signal. Optionally, the reference OOK signal may be statically/semi-statically/dynamically configured by the base station.

Based on the above method, some embodiments of the present disclosure also provide devices implementing the above methods.

Figure 8:
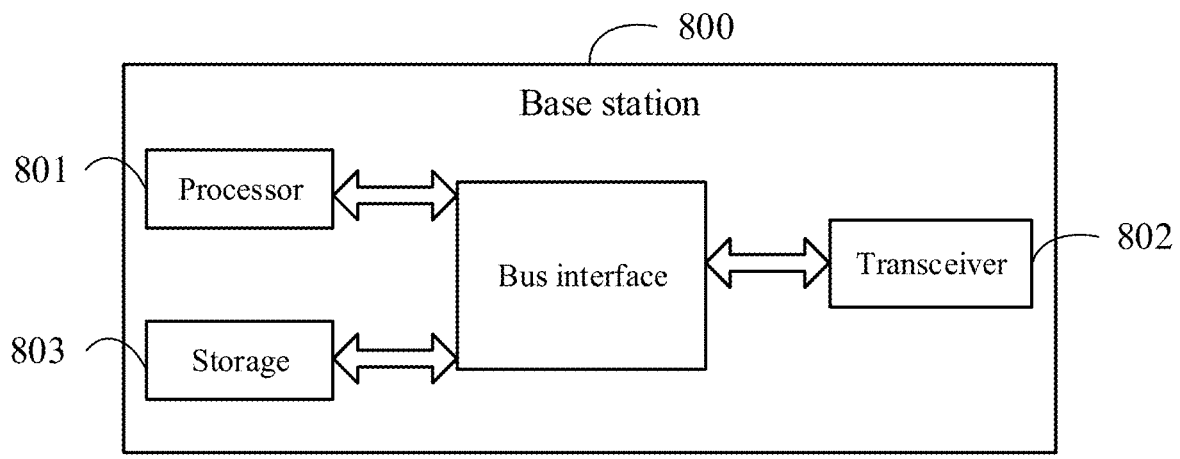
FIG. 8 is a schematic structural diagram of a base station provided by some embodiments of the present disclosure.

Referring to FIG. 8, some embodiments of the present disclosure provide a schematic structural diagram of a base station 800. The base station 800 includes a processor 801, a transceiver 802, a storage 803, and a bus interface, wherein, in some embodiments of the present disclosure, the base station 800 also includes a computer program stored on storage 803 and executable by processor 801.

The transceiver 802 is configured for receiving power-saving-signal indication information reported by a first terminal, wherein the power-saving-signal indication information is at least used to indicate that the first terminal supports or does not support reception of the power saving signal; and when the power-saving-signal indication information indicates that the first terminal supports reception of the power saving signal, sending the power saving signal to the first terminal.

Here, the power-saving-signal indication information is further used to indicate at least one of the following information: a type of a power saving signal supported by the first terminal, wherein types of power saving signals include a power saving signal based on a digital baseband receiver, a power saving signal based on a radio frequency analog receiver, a power saving signal based on a sequence, and a power saving signal based on a PDCCH; whether the first terminal needs to configure or support additional usage of the power saving signal, wherein the additional usage includes beam management during a DRX OFF duration.

In FIG. 8, a bus architecture may include any number of interconnected buses and bridges, and connects various circuits including one or more processors represented by the processor 801 and a storage represented by the storage 803. The bus architecture may also connect various other circuits such as peripherals, voltage regulators and power management circuits, which are well known in the art. Therefore, a detailed description thereof is omitted herein. A bus interface provides an interface. The transceiver 802 may be multiple elements, such as a transmitter and a receiver, to allow for communication with various other apparatuses on the transmission medium. The processor 801 is responsible for supervising the bus architecture and normal processing and the storage 803 may store the data being used by the processor 801 during operation.

Optionally, the processor 801 is configured to read the program in the storage and execute the following process: before sending the power saving signal, sending configuration information of the power saving signal needing to be received by the first terminal, according to the power-saving-signal indication information, wherein the configuration information at least includes the type of the power saving signal needing to be received by the first terminal.

Optionally, the processor 801 is further configured for semi-statically sending, through an RRC signaling, the configuration information of the power saving signal needing to be received by the first terminal, and/or dynamically sending, through MAC CE or PDCCH, the configuration information of the power saving signal needing to be received by the first terminal.

Optionally, the processor 801 is further configured for, before sending the configuration information of the power saving signal needing to be received by the first terminal, when the power-saving-signal indication information indicates that the first terminal supports multiple types of power saving signals, determining the type of the power saving signal needing to be received by the first terminal, according to at least one of following state information of the first terminal: location change information of the first terminal; reception quality information of a signal of the first terminal; a movement state of the first terminal; an access frequency band of the first terminal.

Figure 9:
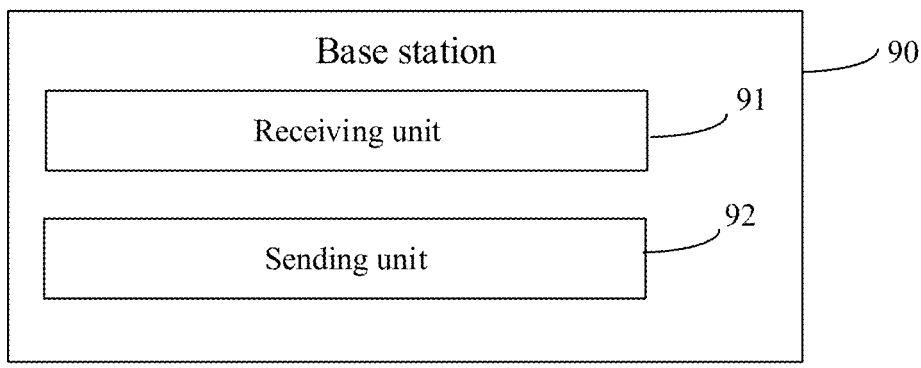
FIG. 9 is another schematic structural diagram of a base station provided by some embodiments of the present disclosure.

Referring to FIG. 9, some embodiments of the present disclosure provide another structure of a base station 90. As shown in FIG. 9, the base station 90 includes a receiving unit 91 and a sending unit 92.

The receiving unit 91 is configured for receiving power-saving-signal indication information reported by a first terminal, wherein the power-saving-signal indication information is at least used to indicate that the first terminal supports or does not support reception of the power saving signal.

The sending unit 92 is configured for, when the first terminal supports reception of the power saving signal, sending the power saving signal to the first terminal.

Figure 10:
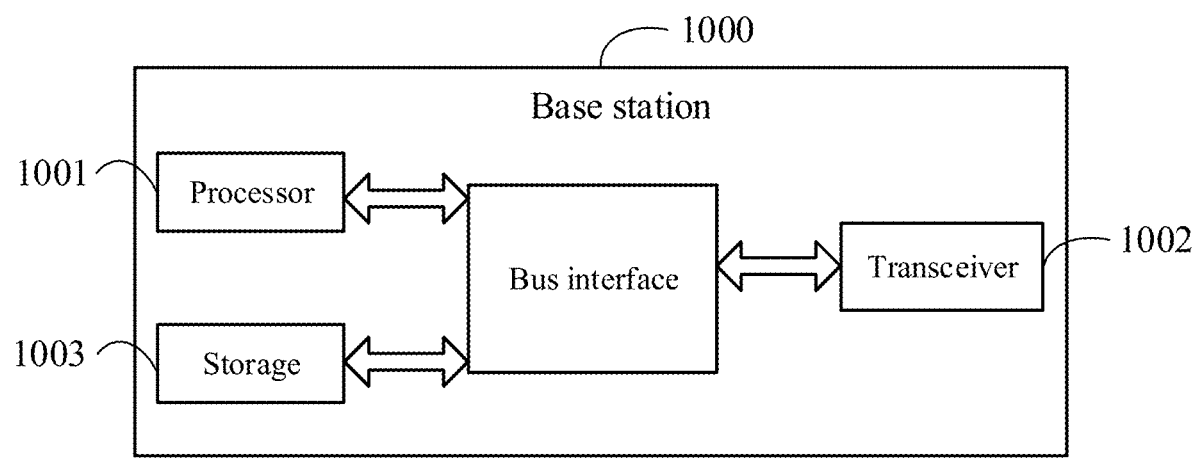
FIG. 10 is still another schematic structural diagram of a base station provided by some embodiments of the present disclosure.

Referring to FIG. 10, some embodiments of the present disclosure provide a schematic structural diagram of a base station 1000. The base station 1000 includes a processor 1001, a transceiver 1002, a storage 1003 and a bus interface, wherein, in some embodiments of the present disclosure, the base station 1000 further includes a computer program stored on the storage 1003 and executable by the processor 1001.

The processor 1001 is configured to read the program in the storage and execute the following processes: when a first terminal needs to be woken up, determining a first binary sequence corresponding to the first terminal.

The transceiver 1002 is configured for sending a power saving signal to the first terminal, wherein the power saving signal includes an On Off Key (OOK) signal of the first binary sequence.

In FIG. 10, a bus architecture may include any number of interconnected buses and bridges, and connects various circuits including one or more processors represented by the processor 1001 and a storage represented by the storage 1003. The bus architecture may also connect various other circuits such as peripherals, voltage regulators and power management circuits, which are well known in the art. Therefore, a detailed description thereof is omitted herein. A bus interface provides an interface. The transceiver 1002 may be multiple elements, such as a transmitter and a receiver, to allow for communication with various other apparatuses on the transmission medium. The processor 1001 is responsible for supervising the bus architecture and normal processing and the storage 1003 may store the data being used by the processor 1000 during operation.

The processor 1001 is responsible for managing the bus architecture and general processing, and the storage 1003 may store data used by the processor 1001 in performing operations.

Optionally, the transceiver 1002 is further configured for receiving the power-saving-signal indication information reported by the first terminal, before sending the power saving signal to the first terminal, wherein the power-saving-signal indication information is at least used to indicate that the first terminal supports or does not support reception of the power saving signal.

The processor 1001 is further configured for determining the first binary sequence corresponding to the first terminal if the first terminal needs to be woken up, in a case that the power-saving-signal indication information indicates that the first terminal supports reception of the power saving signal.

Optionally, the transceiver 1002 is further configured for: performing binary time-domain waveform modulation on a binary sequence corresponding to each of at least one terminal to be woken up including the first terminal, and obtaining the OOK signal of the binary sequence, and then superposing the OOK signals of the binary sequences obtained after the modulation and transmitting the superposed OOK signals; or, superposing respective binary sequences corresponding to the at least one terminal to be woken up including the first terminal, and then modulating a time domain waveform of the OOK signal with respect to a result of the superimposition, and then transmitting the OOK signal.

Optionally, the transceiver 1002 is further configured for sending a pre-configured or pre-agreed reference OOK signal of a binary sequence to the first terminal before sending the power saving signal to the first terminal.

Optionally, the processor 1001 is further configured for, according to the pre-established correspondence relationship between sequence groups and wake up area IDs, determining a first sequence group corresponding to the wake up area ID of the first terminal; and according to the pre-established correspondence relationship between a binary sequence in the sequence group and the wake up ID, determining a first binary sequence corresponding to the wake up ID of the first terminal in the first sequence group.

Optionally, the processor 1001 is further configured for, before determining the first binary sequence corresponding to the first terminal, grouping a plurality of pre-selected binary sequences to obtain a plurality of sequence groups, and establishing correspondence relationship between sequence groups and wake up area IDs, wherein each sequence group corresponds to a wake up area ID, and the plurality of binary sequences are orthogonal sequences or pseudo-random sequences; and establishing correspondence relationship between binary sequences in each sequence group and wake up IDs of terminals in the sequence group.

Optionally, the binary sequences within the sequence groups are different from each other; or, the plurality of sequence groups are divided into at least two sets, each set includes at least one sequence group, and the binary sequences in the sequence groups within the same set are different from each other, and two sequence groups from different sets have at most one same sequence.

Optionally, the correspondence relationship between the sequence group and the wake up area ID is a preset function with time as a parameter.

Optionally, the sequence group is further divided into a plurality of sub-groups, each sub-group includes a part of binary sequences in the sequence group. Each sub-group corresponds to a set of terminal state parameters, the set of terminal state parameters includes time domain resource information for transmitting a power saving signal.

Optionally, the processor 1001 is further configured for generating the first binary sequence corresponding to the first terminal by using wake-up information of the first terminal as a generation parameter for the binary sequence, the wake-up information includes a wake up area ID and/or a wake up ID.

Optionally, when the binary sequence is a gold sequence $c(n)$ generated based on a first M sequence $x_1(n)$ and a second M sequence $x_2(n)$, initial values of the first M sequence $x_1(n)$ and the second M sequence $x_2(n)$ are functions of one or more of the following parameters: a wake up area ID, a wake up ID and other parameters, the other parameters include time domain resource information for transmitting the power saving signal.

Optionally, the processor 1001 is further configured for, according to the pre-established correspondence relationship between a sequence group and a wake up area ID, determining a first sequence group corresponding to the wake up area ID of the first terminal; according to pre-established correspondence relationship between the multi-stage sequence in each sequence group and the wake up ID, determining a first multi-stage sequence corresponding to the wake up ID of the first terminal to obtain the first binary sequence, wherein the multi-stage sequence within each sequence group is a sequence consisting of a plurality of single-stage sequences cascaded, the single-stage sequence is one binary sequence in the sequence group, or is obtained by superposing a plurality of binary sequences within the sequence group.

Optionally, the processor 1001 is further configured for grouping a plurality of pre-selected binary sequences to obtain a plurality of sequence groups, before determining the first binary sequence corresponding to the first terminal; establishing correspondence relationship between the sequence groups and the wake up area IDs, wherein an index of each sequence group corresponds to a wake up area ID, each sequence group includes at least two binary sequences, the plurality of binary sequences are orthogonal sequences or pseudo-random sequences; establishing correspondence relationship between the multi-stage sequence in each sequence group and the wake up ID, wherein, each single-stage sequence in the multi-stage sequence is a binary sequence in the sequence group with the same index, or is obtained by superposing a plurality of binary sequences in the sequence group.

Optionally, the binary sequences within a respective sequence group are different from each other, or the plurality of sequence groups are divided into at least two sets, each set includes at least one sequence group, and the binary sequences in the sequence groups within the same set are different from each other, and two sequence groups from different sets have at most one same sequence.

Optionally, the transceiver 1002 is further configured for, before sending the power saving signal to the first terminal, sending, according to the power-saving-signal indication information, configuration information of the power saving signal needing to be received by the first terminal, wherein the configuration information includes at least the type of the power saving signal needing to be received by the first terminal.

Optionally, the configuration information further includes indication information of the first binary sequence.

Figure 11:
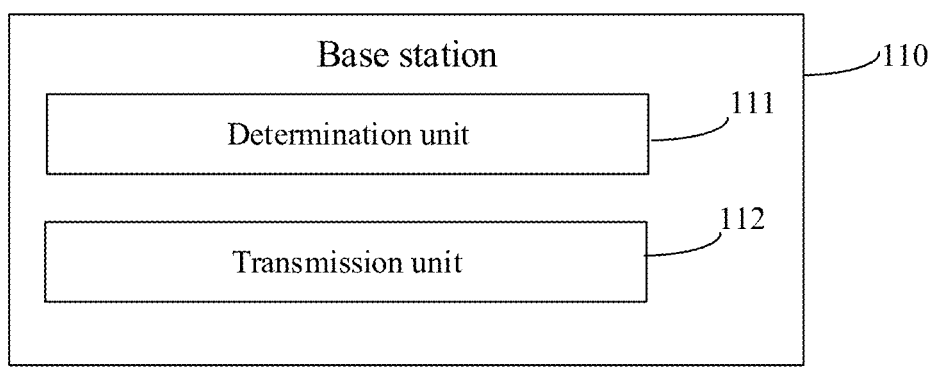
FIG. 11 is still yet another schematic structural diagram of a base station provided by some embodiments of the present disclosure.

Referring to FIG. 11, some embodiments of the present disclosure provide another structure of the base station 110. As shown in FIG. 11, the base station 110 includes a determination unit 111 and a transmission unit 112.

The determination unit 111 is configured for, when a first terminal needs to be woken up, determining a first binary sequence corresponding to the first terminal.

The transmission unit 112 is configured for sending a power saving signal to the first terminal, wherein the power saving signal includes an On Off Key (OOK) signal of the first binary sequence.

Figure 12:
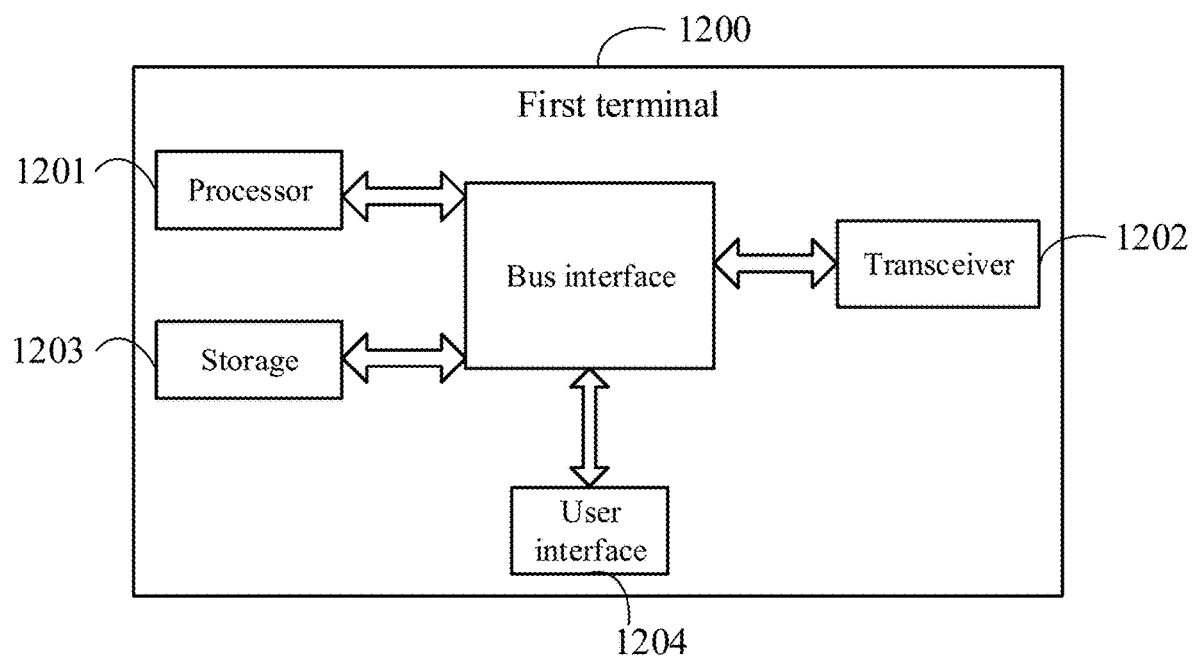
FIG. 12 is a schematic structural diagram of a terminal provided by some embodiments of the present disclosure.

Referring to FIG. 12, FIG. 12 is a schematic structural diagram of a first terminal according to some embodiments of the present disclosure. The first terminal 1200 includes a processor 1201, a transceiver 1202, a storage 1203, a user interface 1204 and a bus interface, wherein, in some embodiments of the present disclosure, the terminal 1200 also includes a computer program stored on the storage 1203 and executable by the processor 1201.

The transceiver 1202 is configured for reporting power-saving-signal indication information to a base station, wherein the power-saving-signal indication information is at least used to indicate that the first terminal supports or does not support reception of the power saving signal.

The processor 1201 is configured to read the program in the storage and execute the following process: when the first terminal supports reception of the power saving signal, detecting the power saving signal sent by the base station.

Optionally, the power-saving-signal indication information is further used to indicate at least one of the following information: a type of a power saving signal supported by the first terminal, wherein types of power saving signals include a power saving signal based on a digital baseband receiver, a power saving signal based on a radio frequency analog receiver, a power saving signal based on a sequence, and a power saving signal based on a PDCCH; whether the first terminal needs to configure or support additional usage of the power saving signal, wherein the additional usage includes beam management during a DRX OFF duration.

In FIG. 12, a bus architecture may include any number of interconnected buses and bridges, and connects various circuits including one or more processors represented by the processor 1201 and a storage represented by the storage 1203. The bus architecture may also connect various other circuits such as peripherals, voltage regulators and power management circuits, which are well known in the art. Therefore, a detailed description thereof is omitted herein. A bus interface provides an interface. The transceiver 1202 may be multiple elements, such as a transmitter and a receiver, to allow for communication with various other apparatuses on the transmission medium. For different terminals, a user interface 1204 may be an interface capable of externally or internally connecting a required device, and the connected device includes, but is not limited to: a keypad, a display, a speaker, a microphone, a joystick and the like. The processor 1201 is responsible for supervising the bus architecture and normal processing and the storage 1203 may store the data being used by the processor 1201 during operation.

Optionally, the processor 1201 is further configured for perform, in the radio frequency domain according to the first binary sequence corresponding to the first terminal, correlation detection on the power saving signal sent by the base station, wherein, the power saving signal includes an On Off Key (OOK) signal of the first binary sequence when the power saving signal is used to wake up the first terminal.

Optionally, the transceiver 1202 is further configured for, before detecting the power saving signal sent by the base station, receiving configuration information, sent by the base station, of the power saving signal needing to be received by the first terminal, the configuration information includes at least the type of the power saving signal needing to be received by the first terminal.

Optionally, the configuration information further includes indication information of the first binary sequence.

The processor 1201 is further configured for determining a first binary sequence corresponding to the first terminal according to the configuration information, before detecting the power saving signal sent by the base station.

Optionally, the transceiver 1202 is further configured for receiving the configuration information, semi-statically sent through an RRC signaling by the base station, of the power saving signal needing to be received by the first terminal; and/or receiving the configuration information, dynamically sent through MAC CE or PDCCH by the base station, of the power saving signal needing to be received by the first terminal.

Optionally, the processor 1201 is further configured for, according to the pre-established correspondence relationship between sequence groups and wake up area IDs, determining a first sequence group corresponding to the wake up area ID of the first terminal; and according to the pre-established correspondence relationship between a binary sequence in the sequence group and the wake up ID, determining a first binary sequence corresponding to the wake up ID of the first terminal in the first sequence group.

Optionally, the processor 1201 is further configured for, before determining the first binary sequence corresponding to the first terminal, grouping a plurality of pre-selected binary sequences to obtain a plurality of sequence groups, and establishing correspondence relationship between sequence groups and wake up area IDs, wherein each sequence group corresponds to a wake up area ID, and the plurality of binary sequences are orthogonal sequences or pseudo-random sequences; and establishing correspondence relationship between binary sequences in each sequence group and wake up IDs of terminals in the sequence group.

Optionally, the binary sequences within the sequence groups are different from each other; or, the plurality of sequence groups are divided into at least two sets, each set includes at least one sequence group, and the binary sequences in the sequence groups within the same set are different from each other, and two sequence groups from different sets have at most one same sequence.

Optionally, the correspondence relationship between the sequence group and the wake up area ID is a preset function with time as a parameter.

Optionally, the sequence group is further divided into a plurality of sub-groups, each sub-group includes a part of binary sequences in the sequence group. Each sub-group corresponds to a set of terminal state parameters, the set of terminal state parameters includes time domain resource information for transmitting a power saving signal.

Optionally, the processor 1201 is further configured for generating the first binary sequence corresponding to the first terminal by using wake-up information of the first terminal as a generation parameter for the binary sequence, before detecting the power saving signal sent by the base station, wherein the wake-up information includes a wake up area ID and/or a wake up ID.

Optionally, when the binary sequence is a gold sequence c(n) generated based on a first M sequence $x_1(n)$ and a second M sequence $x_2(n)$, initial values of the first M sequence $x_i(n)$ and the second M sequence $x_2(n)$ are functions of one or more of the following parameters: a wake up area ID, a wake up ID and other parameters, the other parameters include time domain resource information for transmitting the power saving signal.

Optionally, the processor 1201 is further configured for, before detecting the power saving signal sent by the base station, determining, according to the pre-established correspondence relationship between a sequence group and a wake up area ID, a first sequence group corresponding to the wake up area ID of the first terminal; according to pre-established correspondence relationship between the multi-stage sequence in each sequence group and the wake up ID, determining a first multi-stage sequence corresponding to the wake up ID of the first terminal to obtain the first binary sequence, wherein the multi-stage sequence within each sequence group is a sequence consisting of a plurality of single-stage sequences cascaded, the single-stage sequence is one binary sequence in the sequence group, or is obtained by superposing a plurality of binary sequences within the sequence group.

Optionally, the processor 1201 is further configured for, grouping a plurality of pre-selected binary sequences to obtain a plurality of sequence groups, before determining the first sequence group corresponding to the wake up area ID of the first terminal; establishing correspondence relationship between the sequence groups and the wake up area IDs, wherein an index of each sequence group corresponds to a wake up area ID, each sequence group includes at least two binary sequences, the plurality of binary sequences are orthogonal sequences or pseudo-random sequences; establishing correspondence relationship between the multi-stage sequence in each sequence group and the wake up ID, wherein, each single-stage sequence in the multi-stage sequence is a binary sequence in the sequence group with the same index, or is obtained by superposing a plurality of binary sequences in the sequence group.

Optionally, the binary sequences within the sequence groups are different from each other; or, the plurality of sequence groups are divided into at least two sets, each set includes at least one sequence group, and the binary sequences in the sequence groups within the same set are different from each other, and two sequence groups from different sets have at most one same sequence.

Optionally, the transceiver 1202 is further configured for, before detecting the power saving signal sent by the base station, receiving a pre-configured or pre-agreed reference OOK signal of a binary sequence sent by the base station, and acquiring a single-level reference amplitude of the reference OOK signal. The processor is further configured for performing multi-level detection, in the radio frequency domain according to the single-level reference amplitude, on the power saving signal sent by the base station, and obtaining a multi-level detection signal y.

Optionally, the processor 1201 is further configured for, in the step of detecting the power saving signal sent by the base station, utilizing a normalized cross-correlation function to perform correlation detection on the target binary sequence x and the multi-level detection signal y obtained by detecting, in the radio frequency domain, the power saving signal sent by the base station, wherein the normalized cross-correlation function $\rho(x,y)$ is:

$$\rho(x, y) = \frac{T}{N}\sum_{i=1}^{N}(1-2x_i) - \frac{2}{N}\sum_{i=1}^{N}(1-2x_i)y_i$$

wherein the target binary sequence is x=[$x_1, x_2, \ldots x_N$], $x_i \in \{0,1\}$; the multi-level detection signal y=[$y_1, y_2, \ldots y_N$]; T is the number of binary sequences superposed in the multi-level detection signal.

Optionally, when the binary sequences superposed in the multi-level detection signal are all balanced sequences, the correlation detection is performed after the value of $$\frac{T}{N}\sum_{i=1}^{N}(1-2x_i)$$

in the normalized cross-correlation function ρ(x, y) is 0; when the binary sequences superposed in the multi-level detection signal include an unbalanced sequence, correlation detection is performed after an average amplitude value of the multi-level detection signal is taken as a value of $$\frac{T}{N}\sum_{i=1}^{N}(1-2x_i)$$

in the normalized cross-correlation function ρ(x,y), or correlation detection is performed after the maximum amplitude value of the multi-level detection signal is taken as the value of T in the normalized cross-correlation function ρ(x,y).

Figure 13:
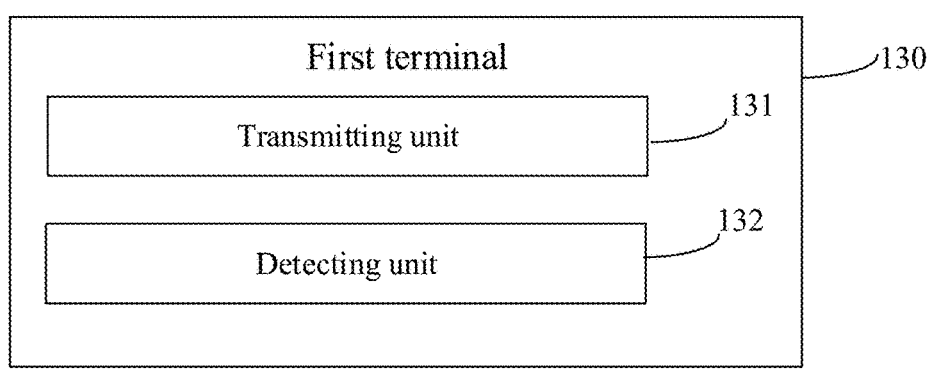
FIG. 13 is another schematic structural diagram of a terminal provided by some embodiments of the present disclosure.

Referring to FIG. 13, some embodiments of the present disclosure provide another terminal 132. The terminal 132 includes a transmitting unit 131 and a detecting unit 132.

The transmitting unit 131 is configured for reporting power-saving-signal indication information to a base station, wherein the power-saving-signal indication information is at least used to indicate that the first terminal supports or does not support reception of the power saving signal.

The detecting unit 132 is configured for, when the first terminal supports reception of the power saving signal, detecting the power saving signal sent by the base station.

A person skilled in the art may be aware that, the exemplary units and algorithm steps described in connection with the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

Those skilled in the art may clearly understand that, to achieve ease and simple description, detailed operation processes of the above system, apparatus and unit are obtained by referring to corresponding processes in the above method embodiments, which are not repeated herein.

In the embodiments provided herein, it should be understood that, the disclosed apparatuses and methods may be implemented in other ways. For example, the device embodiments provided above are only illustrative, for example, a division to units is only a logical functional division, and other division exists in practical application. For example, multiple units or elements may be combined or integrated into another system, or some features may be ignored or not executed. Additionally, coupling or direct connection or communication connection between elements shown or discussed herein may be implemented via some interfaces, and indirect coupling or communication connections between units or elements may be electrical, mechanical or other coupling or connections.

Units described as separated elements may be or may not be physically distributed. Units shown as elements may be or may not be physical units, i.e., may be collocated in one place or distributed over multiple network units. Some or all of the units may be selected depending on actual application scenarios to implement the purpose of the technical solutions of the embodiments of the present disclosure Additionally, functional units in the embodiments of the present application may be integrated in one processing unit, or may be provided independently, or two or more units may be integrated as one unit.

The functions may be stored in one computer readable storage medium if being implemented by software function units and sold or used as independent products. Based on such understanding, the essential part, or the part contributing the related art, or a part of the technical solutions of the present disclosure may be embodied in software products, which are stored in a storage medium. The computer storage medium includes several instructions used to cause a computer device (which may be a personal computer, a server, or a network device, or the like) to execute all or a part of the steps in the method embodiments of the present disclosure. The storage medium include various medium capable of storing program codes, such as a flash memory, a removable disk, a ROM, a RAM, a magnetic disc, or a compact disk.

A person skilled in the art may be aware that, the exemplary units and algorithm steps described in connection with the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

Those skilled in the art may clearly understand that, to achieve ease and simple description, detailed operation processes of the above system, apparatus and unit are obtained by referring to corresponding processes in the above method embodiments, which are not repeated herein.

In the embodiments provided herein, it should be understood that, the disclosed apparatuses and methods may be implemented in other ways. For example, the device embodiments provided above are only illustrative, for example, a division to units is only a logical functional division, and other division exists in practical application. For example, multiple units or elements may be combined or integrated into another system, or some features may be ignored or not executed. Additionally, coupling or direct connection or communication connection between elements shown or discussed herein may be implemented via some interfaces, and indirect coupling or communication connections between units or elements may be electrical, mechanical or other coupling or connections.

Units described as separated elements may be or may not be physically distributed. Units shown as elements may be or may not be physical units, i.e., may be collocated in one place or distributed over multiple network units. Some or all of the units may be selected depending on actual application scenarios to implement the purpose of the technical solutions of the embodiments.

Additionally, functional units in the embodiments of the present application may be integrated in one processing unit, or may be provided independently, or two or more units may be integrated as one unit.

The functions may be stored in one computer readable storage medium if being implemented by software function units and sold or used as independent products. Based on such understanding, the essential part, or the part contributing the related art, or a part of the technical solutions of the present disclosure may be embodied in software products, which are stored in a storage medium. The computer storage medium includes several instructions used to cause a computer device (which may be a personal computer, a server, or a network device, or the like) to execute all or a part of the steps in the method embodiments of the present disclosure. The storage medium include various medium capable of storing program codes, such as a flash memory, a removable disk, a ROM, a RAM, a magnetic disc, or a compact disk.

Those skilled in the art may understand that an entirety or a part of flows in the method embodiments of the present disclosure may be achieved by a computer program which controls related hardware. The program may be stored in a computer readable storage medium. When the program is executed, the flows in the method embodiments of the present disclosure are implemented. The storage medium may be a magnetic disc, a compact disk, a Read-Only Memory (ROM) or a Random Access Memory (RAM).

It may be understood that these embodiments described in embodiments of the present disclosure may be implemented by hardware, software, firmware, middleware, microcode or a combination thereof. For hardware implementation, a processing unit may be implemented in one or more Application Specific Integrated Circuits (ASIC), a Digital Signal Processor (DSP), a DSP device (DSPD), a Programmable Logic Device (PLD), a Field-Programmable Gate Array (FPGA), a general-purpose processor, a controller, a microcontroller, a microprocessor, other electronic unit configured to perform the functions in the present disclosure or a combination thereof.

For a software implementation, the techniques described in embodiments of the present disclosure may be implemented by modules (for example, processes or functions) performing the functions described in embodiments of the present disclosure. Software codes may be stored in a storage and executed by a processor. The storage may be implemented internal or external to a processor.

The above descriptions merely describe specific embodiments of the present disclosure. However, the protection scope of the present disclosure is not limited thereto. Modifications and replacements may be easily conceived by any person familiar with techniques in the art, and the modifications and replacements fall within the protection scope of the present disclosure. The protection scope of the present disclosure is determined based on the protection scope of the claims.

What is claimed is:

1. A method of transmitting a power saving signal, comprising:
   receiving power-saving-signal indication information reported by a first terminal, wherein the power-saving-signal indication information is at least used to indicate that the first terminal supports reception of the power saving signal or the first terminal does not support reception of the power saving signal;
   sending the power saving signal to the first terminal when the power-saving-signal indication information indicates that the first terminal supports reception of the power saving signal,
   wherein the power-saving-signal indication information is further used to indicate at least one of following information:
   a type of a power saving signal supported by the first terminal, wherein the type of a power saving signal comprises a power saving signal based on a digital baseband receiver, a power saving signal based on a radio frequency analog receiver, a power saving signal based on a sequence, and a power saving signal based on a Physical Downlink Control Channel (PDCCH);
   whether the first terminal needs to configure or support additional usage of the power saving signal, wherein the additional usage comprises beam management during a Discontinuous Reception OFF (DRX OFF) duration.

2. The method according to claim 1, wherein before sending the power saving signal, the method further comprises:
   sending configuration information of the power saving signal needing to be received by the first terminal, according to the power-saving-signal indication information, wherein the configuration information comprises at least the type of the power saving signal needing to be received by the first terminal.

3. The method according to claim 2, wherein before sending the configuration information of the power saving signal needing to be received by the first terminal, the method comprises determining the type of the power saving signal needing to be received by the first terminal, according to at least one of following pieces of state information of the first terminal, when the power-saving-signal indication information indicates that the first terminal supports multiple types of power saving signals:
   location change information of the first terminal;
   reception quality information of a signal of the first terminal;
   a movement state of the first terminal;
   an access frequency band of the first terminal.

4. A method of transmitting a power saving signal, comprising:
   determining a first binary sequence corresponding to a first terminal when the first terminal needs to be woken up;
   sending the power saving signal to the first terminal, wherein the power saving signal comprises an On Off Key (OOK) signal of the first binary sequence,
   wherein sending the power saving signal to the first terminal comprises:
   performing binary time-domain waveform modulation on at least one binary sequence corresponding to at least one terminal to be woken up comprising the first terminal, and obtaining OOK signals of the at least one binary sequence, and then superposing the OOK signals of the at least one binary sequences and transmitting the superposed OOK signals;
   or,
   superposing at least one binary sequence corresponding to at least one terminal to be woken up comprising the first terminal, and then modulating and transmitting a time domain waveform with respect to a result of the superimposition.

5. The method according to claim 4, wherein before sending the power saving signal to the first terminal, the method further comprises:
receiving the power-saving-signal indication information reported by the first terminal, wherein the power-saving-signal indication information is at least used to indicate that the first terminal supports reception of the power saving signal or the first terminal does not support reception of the power saving signal;
when the power-saving-signal indication information indicates that the first terminal supports the reception of the power saving signal, determining the first binary sequence corresponding to the first terminal when the first terminal needs to be woken up.

6. The method according to claim 4, wherein before sending the power saving signal to the first terminal, the method further comprises:
sending a pre-configured or pre-agreed reference OOK signal of a binary sequence to the first terminal.

7. The method according to claim 4, wherein,
determining the first binary sequence corresponding to the first terminal comprises:
determining a first sequence group corresponding to a wake up area Identifier (ID) of the first terminal according to pre-established correspondence relationship between a sequence group and a wake up area ID;
determining the first binary sequence corresponding to a wake up ID of the first terminal in the first sequence group according to pre-established correspondence relationship between a binary sequence in a sequence group and a wake up ID;
or,
determining the first binary sequence corresponding to the first terminal comprises:
generating the first binary sequence corresponding to the first terminal by using wake-up information of the first terminal as a generation parameter for the binary sequence, wherein the wake-up information comprises a wake up area ID and/or a wake up ID;
or,
determining the first binary sequence corresponding to the first terminal comprises:
determining a first sequence group corresponding to a wake up area Identifier (ID) of the first terminal according to pre-established correspondence relationship between a sequence group and a wake up area ID;
determining a first multi-stage sequence corresponding to a wake up ID of the first terminal to obtain the first binary sequence, according to pre-established correspondence relationship between a multi-stage sequence in each sequence group and a wake up ID, wherein the multi-stage sequence within each sequence group is a sequence consisting of a plurality of single-stage sequences cascaded, the single-stage sequence is one binary sequence in the sequence group, or is obtained by superposing a plurality of binary sequences within the sequence group.

8. A method of detecting a power saving signal, comprising:
reporting power-saving-signal indication information to a base station, wherein the power-saving-signal indication information is at least used to indicate that the first terminal supports reception of the power saving signal or the first terminal does not support reception of the power saving signal;
detecting the power saving signal sent by the base station when the first terminal supports the reception of the power saving signal,
wherein the power-saving-signal indication information is further used to indicate at least one of following information:
a type of a power saving signal supported by the first terminal, wherein the type of a power saving signal comprises a power saving signal based on a digital baseband receiver, a power saving signal based on a radio frequency analog receiver, a power saving signal based on a sequence, and a power saving signal based on a Physical Downlink Control Channel (PDCCH);
whether the first terminal needs to configure or support additional usage of the power saving signal, wherein the additional usage comprises beam management during a Discontinuous Reception OFF (DRX OFF) duration.

9. The method according to claim 8, wherein detecting the power saving signal sent by the base station comprises:
performing, in a radio frequency domain according to a first binary sequence corresponding to the first terminal, correlation detection on the power saving signal sent by the base station, wherein, the power saving signal comprises an On Off Key (OOK) signal of the first binary sequence when the power saving signal is used to wake up the first terminal.

10. The method according to claim 9, wherein before detecting the power saving signal sent by the base station, the method further comprises:
receiving configuration information, sent by the base station, of the power saving signal needing to be received by the first terminal, wherein the configuration information comprises at least the type of the power saving signal needing to be received by the first terminal.

11. The method according to claim 9, wherein,
before detecting the power saving signal sent by the base station, the method further comprises:
determining a first sequence group corresponding to a wake up area Identifier (ID) of the first terminal according to pre-established correspondence relationship between a sequence group and a wake up area ID;
determining the first binary sequence corresponding to a wake up ID of the first terminal in the first sequence group according to pre-established correspondence relationship between a binary sequence in a sequence group and a wake up ID;
or,
before detecting the power saving signal sent by the base station, the method further comprises:
generating the first binary sequence corresponding to the first terminal by using wake-up information of the first terminal as a generation parameter for the binary sequence, wherein the wake-up information comprises a wake up area ID and/or a wake up ID;
or,
before detecting the power saving signal sent by the base station, the method further comprises:
determining a first sequence group corresponding to a wake up area Identifier (ID) of the first terminal according to pre-established correspondence relationship between a sequence group and a wake up area ID;

determining a first multi-stage sequence corresponding to a wake up ID of the first terminal to obtain the first binary sequence, according to pre-established correspondence relationship between a multi-stage sequence in each sequence group and a wake up ID, wherein the multi-stage sequence within each sequence group is a sequence consisting of a plurality of single-stage sequences cascaded, the single-stage sequence is one binary sequence in the sequence group, or is obtained by superposing a plurality of binary sequences within the sequence group.

12. The method according to claim 11, wherein before determining the first sequence group corresponding to the wake up area ID of the first terminal, the method further comprises:

grouping a plurality of pre-selected binary sequences to obtain a plurality of sequence groups, and establishing the correspondence relationship between a sequence group and a wake up area ID, wherein each sequence group corresponds to a wake up area ID, and the plurality of binary sequences are orthogonal sequences or pseudo-random sequences; and establishing the correspondence relationship between a binary sequence in each sequence group and a wake up ID of a terminal in the sequence group.

13. The method according to claim 12, wherein, binary sequences within the plurality of sequence groups are different from each other; or, the plurality of sequence groups are divided into at least two sets, each set comprises at least one sequence group, and binary sequences in sequence groups within a same set are different from each other, and two sequence groups from different sets have at most one same sequence.

14. The method according to claim 9, wherein before detecting the power saving signal sent by the base station, the method further comprises receiving a pre-configured or pre-agreed reference OOK signal of a binary sequence sent by the base station, and acquiring a single-level reference amplitude of the reference OOK signal;

detecting the power saving signal sent by the base station comprises: performing multi-level detection, in a radio frequency domain according to the single-level reference amplitude, on the power saving signal sent by the base station, and obtaining a multi-level detection signal y.

15. The method according to claim 9, wherein, detecting the power saving signal sent by the base station comprises:

utilizing a normalized cross-correlation function to perform correlation detection on a target binary sequence x and a multi-level detection signal y obtained by detecting, in a radio frequency domain, the power saving signal sent by the base station, wherein the normalized cross-correlation function $\rho(x,y)$ is:

$$\rho(x, y) = \frac{T}{N}\sum_{i=1}^{N}(1 - 2x_i) - \frac{2}{N}\sum_{i=1}^{N}(1 - 2x_i)y_i$$

wherein the target binary sequence is $x=[x_1, x_2, \ldots x_N]$, $x_i \in \{0,1\}$;

the multi-level detection signal $y=[y_1\ y_2, \ldots y_N]$; T is the number of binary sequences superposed in the multi-level detection signal.

16. A base station, comprising:
a transceiver, a storage, a processor and a computer program stored on the storage and executable by the processor, wherein the processor is configured to read the program in the storage and execute the method according to claim 4;
the transceiver is configured for, under control of the processor, sending information and/or receiving information.

17. A first terminal, comprising:
a transceiver, a storage, a processor and a computer program stored on the storage and executable by the processor, wherein,
the transceiver is configured for sending information and/or receiving information under a control of the processor;
the processor is configured to read the program in the storage and execute the method according to claim 8.

18. A base station, comprising:
a transceiver, a storage, a processor and a computer program stored on the storage and executable by the processor, wherein the processor is configured to read the program in the storage and execute the method according to claim 1;
the transceiver is configured for, under control of the processor, sending information and/or receiving information.

* * * * *